United States Patent
O'Mahoney et al.

(10) Patent No.: US 6,907,300 B2
(45) Date of Patent: Jun. 14, 2005

(54) USER INTERFACE FOR FIRE DETECTION SYSTEM

(75) Inventors: Brian O'Mahoney, Denville, NJ (US); Bruce J. Lontka, Randolph, NJ (US); George Dulski, Westfield, NJ (US); Paul Strelecki, Whitehouse Station, NJ (US); Stuart Morgan, Pittsburgh, PA (US); Justin Petro, Austin, TX (US); Jeremiah Blatz, Pittsburg, PA (US); Noah Guyot, San Franciso, CA (US); John Duran, Milwaukee, WI (US); Phil Oye, New York, NY (US)

(73) Assignee: Siemens Building Technologies, Inc., Buffalo Grove, IL (US)

(*) Notice: Subject to any disclaimer, the term of this patent is extended or adjusted under 35 U.S.C. 154(b) by 0 days.

(21) Appl. No.: 10/199,802

(22) Filed: Jul. 19, 2002

(65) Prior Publication Data

US 2003/0097188 A1 May 22, 2003

Related U.S. Application Data

(60) Provisional application No. 60/306,778, filed on Jul. 20, 2001.

(51) Int. Cl.[7] .............................................. G05B 11/01
(52) U.S. Cl. ........................ 700/17; 700/19; 700/75; 700/83; 715/855; 715/764; 715/707; 345/173
(58) Field of Search ............................. 700/17, 19, 75, 700/83; 340/990; 342/457; 715/853–855, 800, 840, 759, 764, 707; 345/173, 707, 759, 764, 800, 840, 853–855, 716–718, 727, 740, 750, 765, 866, 700

(56) References Cited

U.S. PATENT DOCUMENTS 5,295,062 A * 3/1994 Fukushima .................. 700/83
5,295,242 A * 3/1994 Mashruwala et al. ....... 345/853
5,297,252 A    3/1994 Becker ........................ 345/808
5,361,198 A * 11/1994 Harmon et al. ............... 700/83
5,631,825 A * 5/1997 van Weele et al. ........... 700/83
5,664,112 A * 9/1997 Sturgeon et al. ............ 705/28
5,726,883 A * 3/1998 Levine et al. ................ 700/83
5,956,025 A * 9/1999 Goulden et al. ............ 345/716
6,161,066 A * 12/2000 Wright et al. ............... 701/36
6,169,927 B1 * 1/2001 Schonthal et al. ........... 700/1
6,232,968 B1 * 5/2001 Alimpich et al. ........... 345/744
6,336,053 B1 * 1/2002 Beatty ....................... 700/108
6,396,516 B1 * 5/2002 Beatty ....................... 345/764
6,433,801 B1 * 8/2002 Moon et al. ................ 345/840
6,647,302 B2 * 11/2003 Pouchak ..................... 700/83
6,829,513 B2 * 12/2004 Piersanti et al. ............. 700/83
2002/0022894 A1 * 2/2002 Eryurek et al. .............. 700/80
2002/0196202 A1 * 12/2002 Bastian et al.
2003/0158635 A1 * 8/2003 Pillar et al.
2003/0210228 A1 * 11/2003 Ebersole et al.

FOREIGN PATENT DOCUMENTS

EP           0940787 A2    3/1994  ........... G08B/17/00
WO         WO 02/31607    4/2002  ......... G05B/19/042

OTHER PUBLICATIONS

PCT International Search Report—Int. Application No. PCT/US03/22529.

* cited by examiner

*Primary Examiner*—Anthony Knight
*Assistant Examiner*—Crystal J. Barnes

(57) ABSTRACT

A user interface for controlling and displaying information about devices in a system is disclosed. The user interface is designed to meet the needs for different types of users. A user with no familiarity with the system is provided with a customized message on the display of the user interface. A user with limited experience using the interface may be provided with one or more dedicated input devices for obtaining further information about the system. For a more experienced user, a touch screen is provided allowing the user to control devices from the user interface.

54 Claims, 22 Drawing Sheets

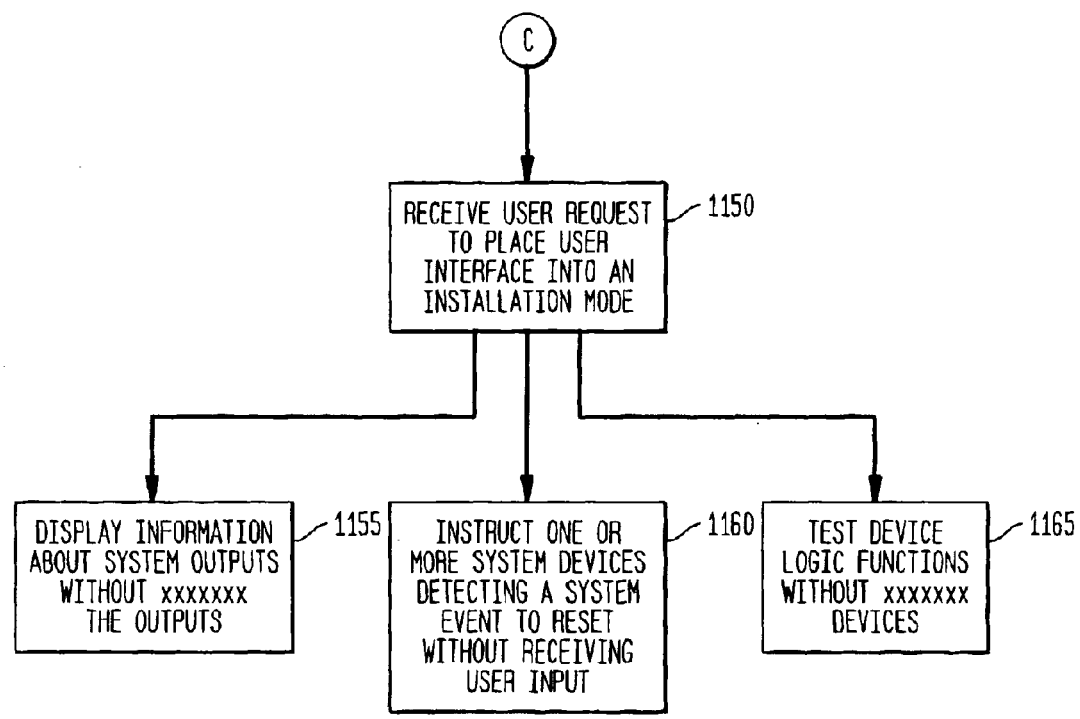

FIG. 9
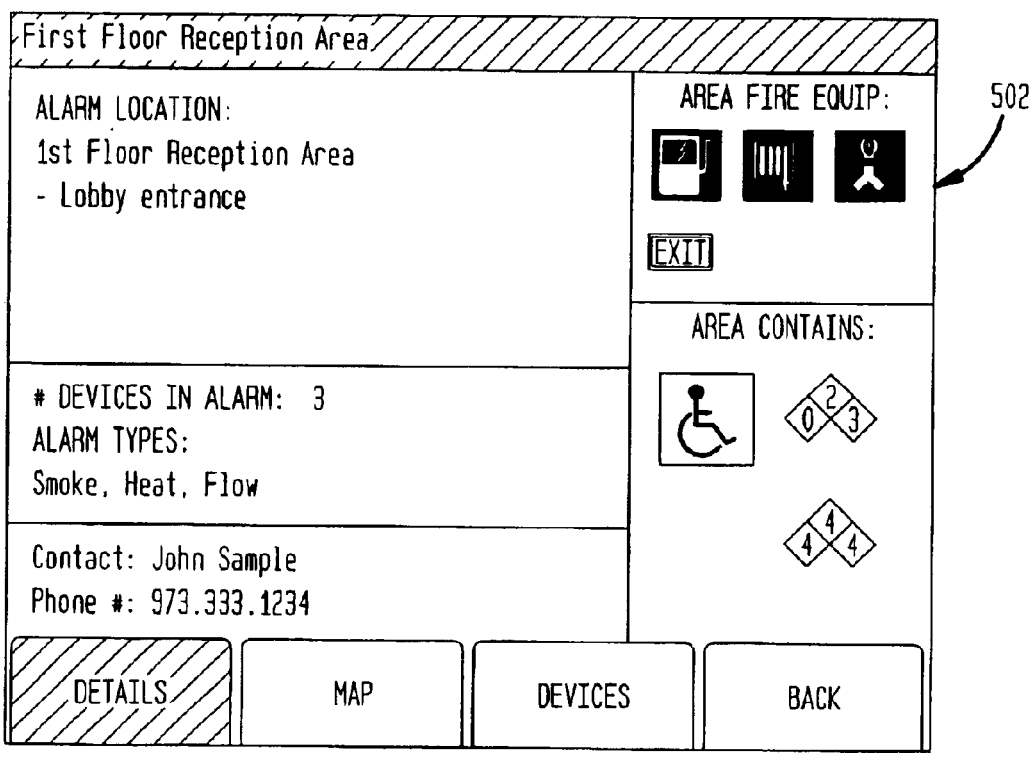

USER INTERFACE FOR FIRE DETECTION SYSTEM

CROSS-REFERENCE TO RELATED CO-PENDING APPLICATIONS

This application claims the priority to and the benefit of Provisional Application No. 60/306,778 entitled "Fire Safety System," filed Jul. 20, 2001.

The following patent applications cover subject matter related to the subject matter of the present invention: "Fire Protection System and Method for Configuring" U.S. Ser. No. 10/198,803; "User Interface with Installment Mode" U.S. Ser. No. 10/199,801; "Fire Detection System Including an Automatic Polarity Sensing Power and Signal Interface" U.S. Pat. No. 6,738,238; "Portable Diagnostic Device" U.S. Ser. No. 10/199,517.

BACKGROUND OF THE INVENTION

The present invention relates to a computerized system for monitoring a facility comprised of one or more buildings. For safety and security, such facilities are provided with monitoring systems that employ detectors distributed throughout the facility and a central monitoring station, such as a control panel, operatively connected to detectors to receive messages and to control the devices. Such systems generally include varying types of detectors such as smoke detectors, heat detectors and motion detectors and security detectors that determine when doors or other entry points have been tampered with.

The problem with prior control panels is that the user interfaces generally provided with such control panels are not designed to be used with different types of users. Further, such control panels do not provide sophisticated users with several different modes of operation allowing the user the ability to generate reports, performance system maintenance and install new nodes, modules and devices from the control panel using the user interface.

SUMMARY OF THE INVENTION

In the present invention, there is provided a facility system operator interface designed to make status information presentation clear and system control functions simple to operate. The system includes a plurality of devices disposed throughout a monitored facility. Each device can generate a signal indicating detection of a predetermined event or condition. A facility control panel is provided to control devices in the system and to display information about the devices on a display. Through the use of soft function buttons on the systems display—prompted by lighted physical buttons—the user can easily "Acknowledge" events, "Silence" or "Unsilence" building audibles, or "Reset" the system. The system status presentation is structured to allow the different types of system events (Alarms, Supervisory, Security, Trouble) to be viewed independently. Each system event presents the user with a custom message describing the location of the alarm report and the type of event (manual alarm, smoke, heat or waterflow). If additional details need to be learned about the nature of the alarm report or its location—the user can depress the illuminated "More Info" button. Additional text messages, device specific details and simple graphic maps displayed on display tell the user where they are in the building relative to the alarm report for ease in locating the alarm. The interface is designed to meet the needs of different types of users. For users unfamiliar with the interface, a customized message is displayed on the interface display providing the users with general information about the building system. Dedicated input devices are provided adjacent the interface display allowing a more sophisticated user to obtain help information and to obtain a menu of available information. For users trained to operate the interface, the interface provides the user with a touch screen display allowing the trained user to control devices from the interface using the touch screen.

One object of the invention is to provide a user interface for a fire safety system with several modes of operation. These modes include an alert mode, a report mode, a maintenance mode and an installation mode. The alert mode allows the user to view system events detected by the system. The report mode allows a user to obtain reports about the operation of system nodes, modules and devices. The maintenance mode allows users, using a touch screen display, to control devices from the user interface. The installation mode allows users to operate the user interface in a preferred manner while devices or device loops are being connected to the system.

Another object of the invention is to provide a method using a user interface for displaying information about a system and controlling a system. The user interface may be provided with a display for displaying information about a system. The system is preferably comprised of a plurality of elements such as nodes, modules and devices. Information may be displayed on said display. Subsequent levels of information about said system in response to at least one user input may be displayed until a desired level of information about said system is reached. At least one input device, such as a touch screen cell may be provided to control at least one system element after a predetermined level of information about said system has been displayed. The user interface may receive a user input to control said at least one system element using the at least one input device.

Yet another object of the present invention is to provide a user interface for a fire safety system that is designed to meet the needs of different types of users. A user interface may be provided for displaying information about a system and controlling a system. The user interface is provided with different levels of complexity depending upon the user of the interface. Customized information may be displayed on the display of the user interface, when the user interface is not receiving a user input or is not displaying a system event, for users not familiar with said user interface. Preferably, further information about the system may be displayed in response to a user input using a dedicated input device. The dedicated input device may provided for users with limited familiarity with said user interface. Further, at least one input device such as a touch screen cell may be displayed on the display for controlling at least one system element, such as a node, module or device. The user interface is preferably provided with at least one input device, such as one or more touch screen cells of a touch screen provided on the display for a user familiar with said system and said user interface.

It is another object of the present invention to provide a facility monitoring system comprising for controlling a plurality of devices distributed throughout a facility. Each device may be adapted to generate a signal indicating that a predetermined system event is occurring. The facility monitoring station is preferably provided with a facility monitoring station such as a control panel having a memory. The control panel may be operatively connected to the plurality of devices. The facility monitoring station may be provided with a user interface having a touch screen display for displaying information about the devices. The user interface may also allow a user to control said devices. The touch screen display may be comprised of one or more touch screen cells for controlling one or more devices. The touch screen cells are only operable after a predetermined number of user inputs using one or more dedicated input devices are received by said user interface.

BRIEF DESCRIPTION OF THE DRAWINGS

A better understanding of the objects, features and advantages of the invention can be gained from a consideration of the following detailed description of the preferred embodiment thereof, in conjunction with the appended figures of the drawings.

FIGS 6A–6E constitute a flowchart helpful in understanding the operation of the user interface constructed in accordance with the present invention;

FIG. 9 illustrates a display after a user request for further details about a system event;

DETAILED DESCRIPTION OF THE PREFERRED EMBODIMENT

The advantages of the present invention will be described with respect to the fire safety system, apparatus and methods described below. However the invention is not limited to such embodiments, but may be applied to any building system within the scope of the attached claims.

Figure 1:
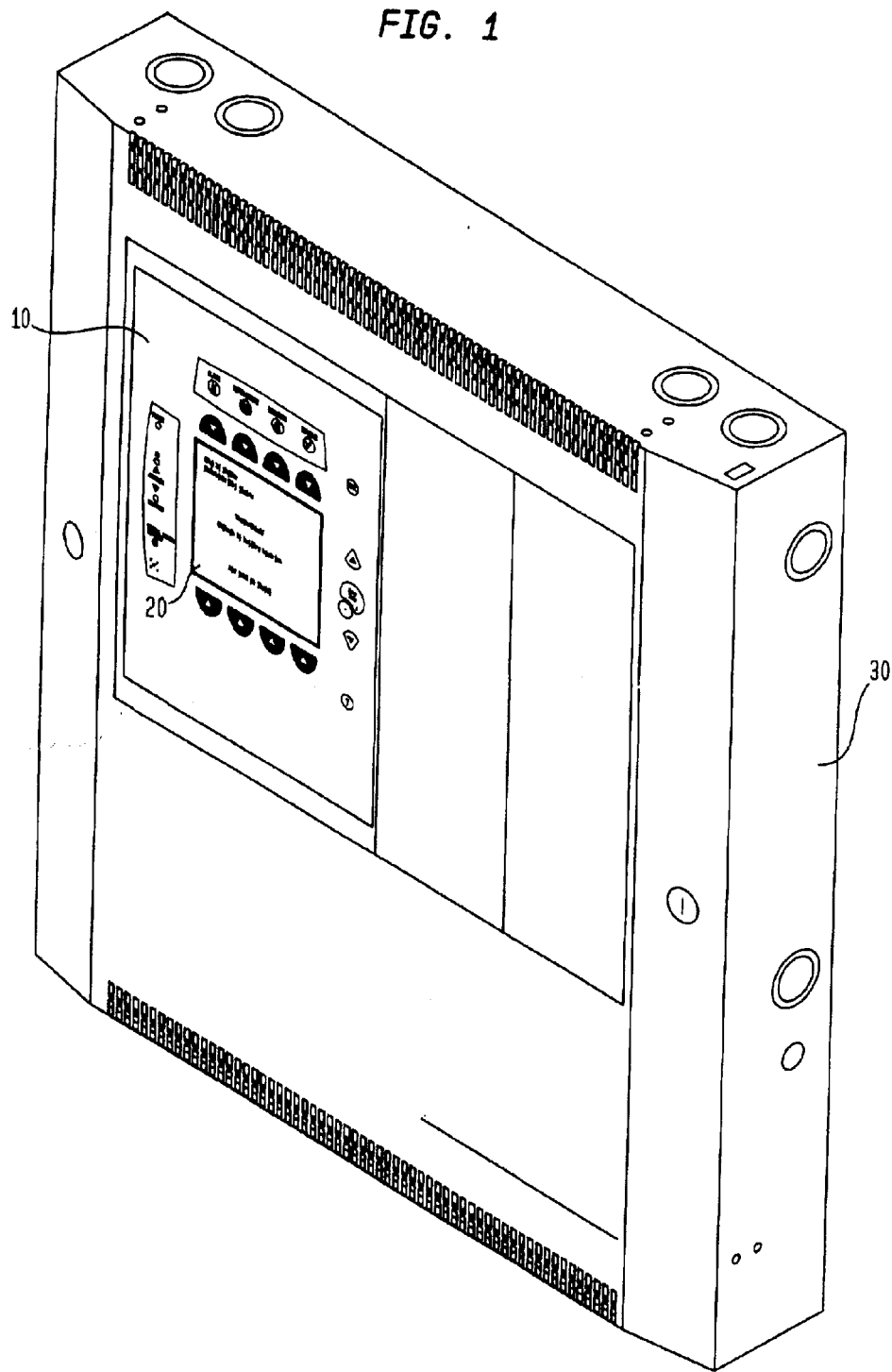
FIG. 1 is a front view of the control panel and user interface of the present invention.

Referring to FIG. 1, the present invention relates to a person-to-machine user interface 10 including a display 20 mounted in a control panel 30 for monitoring and controlling a fire safety system. The control panel 30 is preferably mounted in a facility in a location that is easily accessible to members of the public, maintenance workers and emergency personnel. An operator of the interface 10 can display information about and can operatively one or more fire safety systems operably connected to the control panel 30 and can control the operation of one or more fire safety systems operably connected to the control panel 30.

Figure 2:
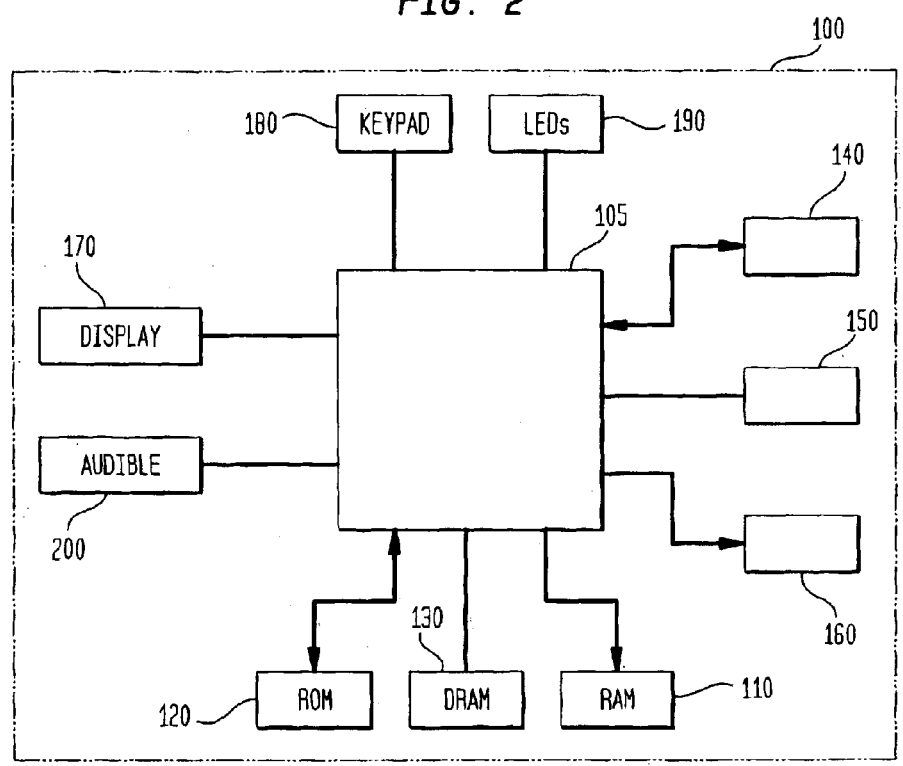
FIG. 2 is a block diagram of the user interface of the present invention.

FIG. 2 is a schematic block diagram showing the general features of the user interface control architecture according to the present invention. In FIG. 2, the user interface 100 has a CPU 105, a RAM 110, a ROM 120 and a DRAM 130. The CPU 105 is preferably a Elan SC400 microcontroller from AMD. RAM 110 is preferably a non-volatile flash memory which stores the operating firmware as well as the site specific database. The CPU 105 rapidly processes logical decisions based on the status of the smoke detectors in a fire safety system operably connected to the control panel and other initiating devices to control the system outputs. The CPU 105 controls operation of the fire safety system via a bus according to stored program instructions in memory and user input from the user interface 100.

The user interface 100 comprises one or more interfaces for communicating with different levels of systems. These one or more interfaces allow the user interface 100 to communicate with user interface's 100 in other systems in a LAN, WAN, intranet or internet. Referring to FIG. 2, user interface 10 comprises interface 140 which is connected to the CPU 105 and allows the user interface 100 in one cabinet to communicate with a user interface 100 in another cabinet. User interface 100 further comprises interface 150 connected to the CPU 105 and allows the user interface 100 in one system to communicate with one or more user interfaces 100 in other systems. User interface 100 may also comprise interface 160 for allowing the user interface to be connected to a building automation system. Preferably, interface 160 is a BACNET interface. The user interface 100 further comprises a touch screen display 170, a keypad 180, LEDs 190 and audibles 200 connected to the CPU 105.

Figure 3:
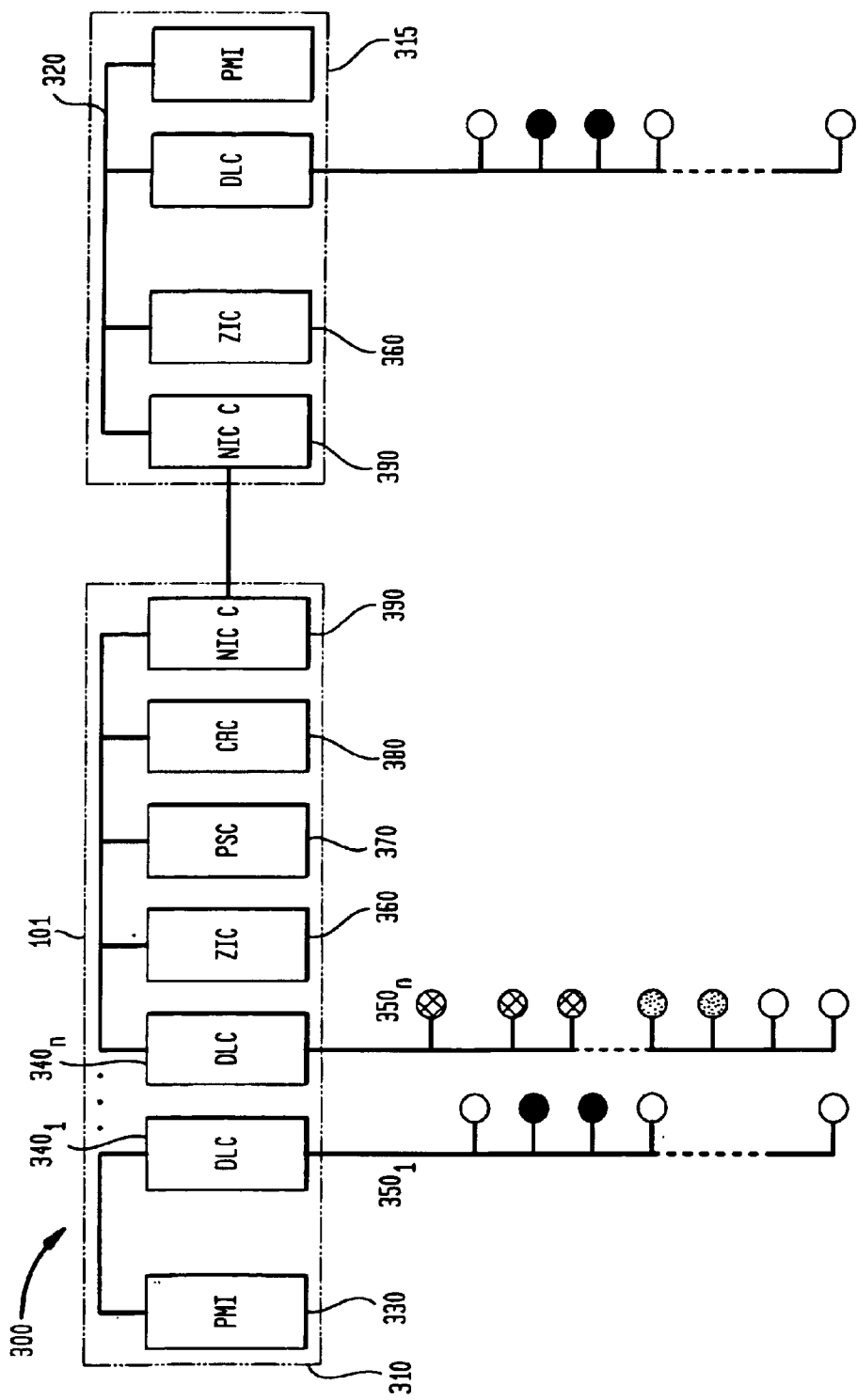
FIG. 3 is a schematic block diagram of the system of the present invention.

Referring to FIG. 3, a system upon which an embodiment of the present invention can be implemented is shown as 300. System 300 is comprised of a first enclosure 310, such as a control panel cabinet, and at least other enclosure 315, such as a remote cabinet. Main cabinet 310 comprises a bus 101, or other communications hardware or software, for communicating information and signals. A person-to-machine interface user interface 330, coupled to bus 320, is used to view system information and to input control data.

System 300 further comprises one or more device loop controllers $340_1$–$350_n$ coupled to the bus 320 for controlling a loop of devices $350_1$–$350_n$. Each device loop controller 340 is the central communication point for detectors, manual pull stations and other devices such as relay bases, audible bases and remote lamps in any combination on the detector electrical loop 350. Each device loop controller 340 communicates with these device loops 350 via a protocol. Each device loop controller 340 may support up to 252 devices in one device loop 350, which consists of two independent parallel zones. Each zone may be electronically isolated should a short occur, without affecting the remaining zone. Each device loop controller 340 initializes, operates, and maintains all devices residing on the device loop 350 and communicates all relevant device and event information, such as alarms and troubles, to the interface 330. Each device loop controller 350 allows the system 300 polarity insensitive devices to be connected without generating errors. By adding further device loop controllers 340 in system 300, the system 330 can be expanded to support thousands of intelligent detectors and devices spread across a flexible number of device loops 350.

The system 300 further comprises zone indicating module 360 coupled to bus 320 which provides power to and communications with annunciation devices (alarms, strobes, etc) in the system 300. These annunciation devices can be software configured for a wide variety of functions—such as standard NAC operation (bells, horns, chimes), strobes (synchronized or non-synchronized), coded audibles (Temporal Code 3, Marchtime, Zone Coded, etc.), Municipal Tie, Leased Line, Extinguishing agent releasing (FM-200 or Halon) or sprinkler pre-action and deluge applications.

The system 300 also comprises power supply module 370 coupled to bus 320 for supplying power to the modules operably connected to bus 320. The system further includes control relay module 380 connected to bus 320. This control relay module 380 provides multiple relays with which to operate devices such as bells, horns, strobes, etc.

The system 300 further includes one or more interface modules 390 coupled to bus 320. The interface module 390 provides network communications between enclosures 310 and 315 in the system 300. The interface module 390 supervises the system 300 to insure proper operation. Any faults that are detected by the interface module 390 are reported to the interface 330 for annunciation. In addition, the interface module 390 has diagnostic LEDs (not shown) that indicate which faults have been found. Individual LEDs are included for Loop A and Loop B faults, as well as an LED for complete failure of the system 10. The interface module 390 can also be configured to perform ground fault detection in the system 300. Preferably, each interface module 390 occupies one address. One network interface module is provided for each enclosure 310,315. Further, when the present invention is implemented in a network, discussed further herein, the system 300 may be provided another network interface module, not shown, allowing the system 300 to interface with a network. The network interface module provides network communications between a particular system node with other nodes in the network.

Each module in the system 300 has its own microprocessor. To ensure reliable operation, if the interface's 330 CPU stops, these modules, operating in degrade, still annunciate any alarm or trouble through common lines called Any Alarm and Any Trouble. Preferably, all of the modules communicate with the interface's 330 CPU through an RS-485 network communications system. The microprocessor of each device loop controller 340 controls the on-board isolator to isolate either zone from the device loop 350 if one of them is shorted. When one zone is isolated from the device loop 350, the other zone will still work. The on-board microprocessor provides the device loop controller 340 with the ability to function and initiate alarm conditions even if the interface's 330 CPU fails.

Figure 4:
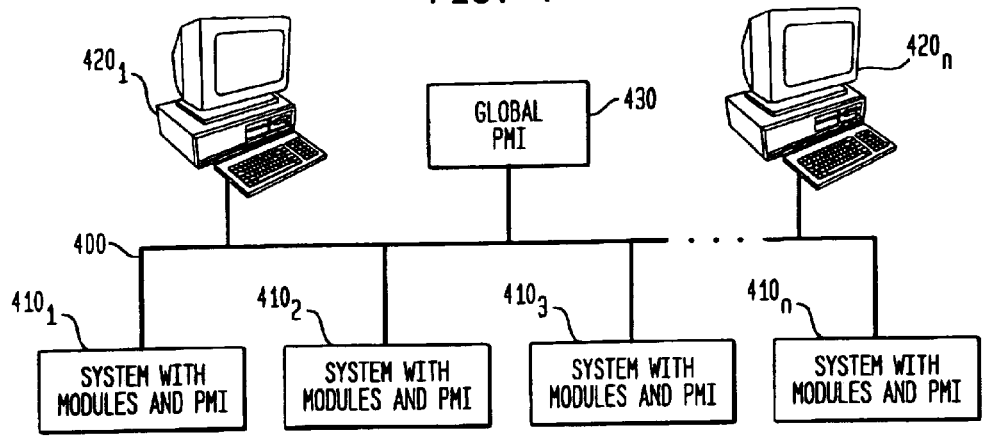
FIG. 4 is a schematic block diagram of the system of the present invention operating in a network environment.

FIG. 4 depicts a network environment 400 for one or more fire safety systems 410. According to the present invention, each fire safety system $410_1$–$410_n$ may operate in a networked environment 400 using logical connections to one or more other fire safety systems. The network environment depicted in FIG. 1 may be a LAN, a WAN, an intranet or the internet. In a preferred embodiment, the one or more fire safety systems 410 are connected through a user selected protocol.

When used in a LAN networking environment, the each system 410 is connected to the local network 400 through a network interface, such as the interface module discussed above. When used in a WAN networking environment, the interface of each system 410 typically includes a modem or other means for establishing communications over the WAN. The modem, which may be internal or external, is connected to a system bus via a serial port interface. It will be appreciated that the network connections shown are exemplary and other means of establishing a communications link between the systems 410 may be used.

The network shown in FIG. 4 comprises one or more PC-based network monitoring and control locations $420_1$–$420_n$. These PCs 420 allow an operator to see events in the network 400 and also display graphics relative to the network 400 and individual safety systems 410. Each PC 420 allows an operator to remotely control any or all of the systems, each system representing a node, and well as set configurations. It is important to note that operation of any of the PCs 420 is not essential for operation of the systems 410. The PCs 420 provide a manual point of control of the network 400 and are not part of the automatic functions of the network 400. Preferably, each of the nodes in the network operates independently. Accordingly, the network 400 depicted in FIG. 4 will still operate if the PCs 420 are not operational.

The global user interface 430 is intended to operate similarly to the network PCs 420. It is an operator display and control point but is not essential for the operation of the network 400 or any of the systems 410. The global user interface 430 will be able to be configured to display and control all or part of the system based on geographic zones. Such a configuration will generally be provided at installation time. While FIG. 4 depicts only one global user interface 430, many global user interface's may be connected to the network 400.

In a preferred embodiment, because of redundancy concerns in a life safety system, a system 410 cannot control another system's 410 outputs directly automatically. When one system 410 detects a system event, it will broadcast the event to all of the other systems 410. The other systems 410 decide if that system event will cause a change on any of their local outputs. However in an alternative embodiment, a system may be configured to control other systems' 410 outputs directly.

Figure 5:
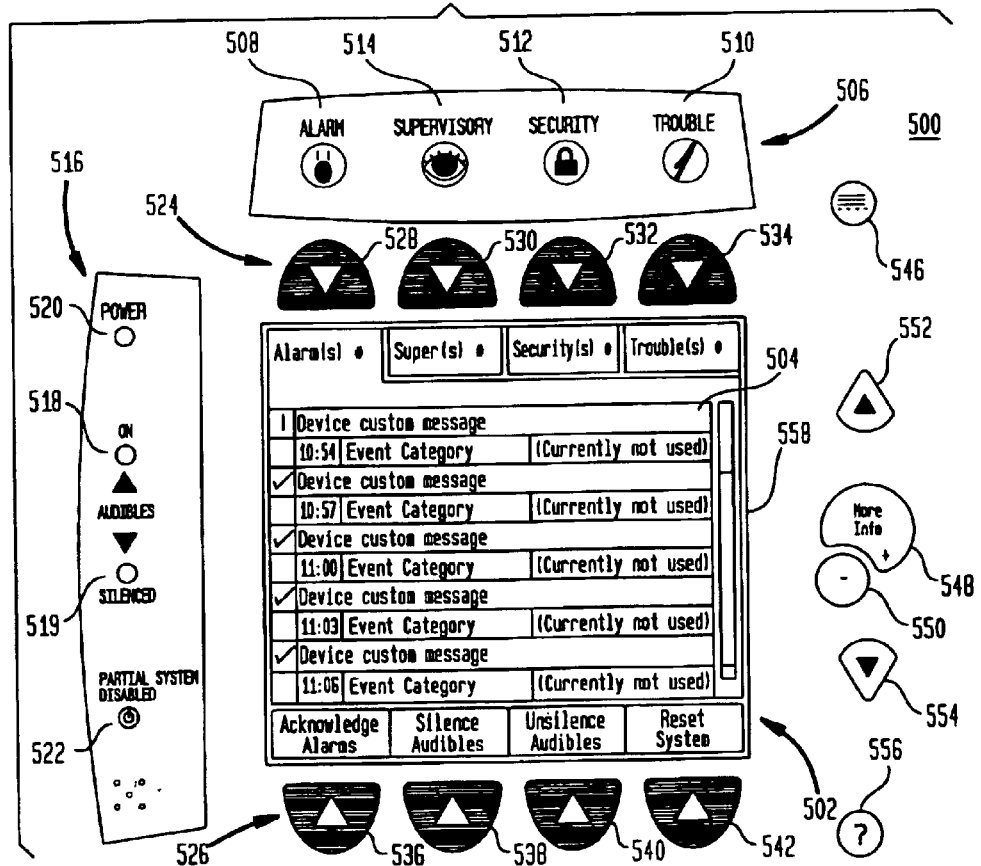
FIG. 5 illustrates a plurality of alarm events being displayed on the user interface.

The preferred person-to-machine interface of the present invention is shown in FIG. 5. The interface 500 is the primary user interface for the fire safety system of the present invention. From the interface 500 a user can acknowledge events, control the system notification appliance circuits and reset the system. Detailed information about the nature and location of events can also be displayed.

Interface 500 is comprised of a display 502, preferably a ¼ VGA monochrome 8×8 matrix LCD touch screen 504 which provides a soft function button operator interface. The display 502 with the touch panel 504 is designed such that the touch panel 504 is attached to the entire display 502 with a backlight. With this arrangement, a user input into the user interface 500 can be performed by directly touching the surface of the touch panel 504 with a finger or a pen in accordance with an information display on the display 502. Discrete LEDs 506, comprised of ALARM LED 508, TROUBLE LED 510, SECURITY LED 512 and SUPERVISORY LED 514, are provided for displaying system status information. These LEDs 506 indicate at a glance if any events are present in the system previously described. A flashing LED indicates unacknowledged events while a steady LED shows that all the events of that type have been acknowledged by an operator. An audible sounds when there are unacknowledged events on the interface 500.

The present invention is further comprised of a second set of LEDs 516. LEDS 518 and 519 indicate the state of the audibles, where LED 518 flashes when the audibles are active and LED 519 glows steadily when the audibles are silenced. LED 520 shows that power is applied. LED 520 is on steady when the system is running from AC and flashes when on battery. The interface 500 further comprises a partial system disabled LED 522 for indicating when any module or device in the system is disabled.

Depicted in FIG. 5 keypads 524 and 526 are each comprised of a row of four keys. Keypad 524 is provided above the display 502 and keypad 526 is provided below the display 502. Keypad 524 is comprised of keys 528, 530, 532 and 534. Keypad 526 is comprised of keys 536, 538, 540 and 542. While FIG. 5 depicts the use of two rows of four keys 524 and 526, any number of keys may be used with the present invention. The use of keys 528–542 is controlled by software and backlit with a green LED which guides the operator to the next action. These rows of keys 524 and 526 have no specific function assigned to them.

The interface 500 is further comprised of keys 546, 548, 550, 552, 554 and 556 to the right of the display. Key 546 is provided to allow a user to display a menu of available information. Keys 548 and 550 allow a user to obtain more information and allow a user to navigate up or down through levels of detail about a selected event. Keys 552 and 554 allow scrolling up or down or entering in and out of event detail screens. The selected listing is highlighted in the display 502. Key 556 is provided to allow a user to obtain context sensitive help. If there are more events in the system than can be displayed on a single screen, a scroll bar 558 appears to the right of the event list.

A user may control the fire safety system with the keypads 524, 526 and the touch screen 504. The context of the touch screen 504 changes based on the system state. Events cause the display 502 to show pertinent information. The user can then review and acknowledge events. Audible devices can be silenced and the system can be reset. The user is guided to the next active key with a flashing backlite behind the key. In this way the user does not require any knowledge of the interface 500 to control the system. For more advanced users a complete menu of maintenance and diagnostics is provided. These menus may be password protected.

During normal system operation the interface's 500 green power LED 520 is on steady, the local audible is silent and the display 502 preferably contains a user selected default graphic. Pressing the menu key 546 will display the highest level of the interface's 500 menuing system. If at any time the event is received the user interface display 502 will switch to the correct context, the associated LED 508, 510, 512 or 514 will begin to flash and the local audible will sound. When the operator acknowledges the event the LED will go steady and the local audible will silence. Once all outstanding events have been acknowledged the system can be reset. If the event caused audibles to sound the audible LED 518 will flash. The interface 500 will offer a selection to silence the audibles once the event is acknowledged. The audibles LED 519 will go steady when the audibles are silenced.

Figure 6A:
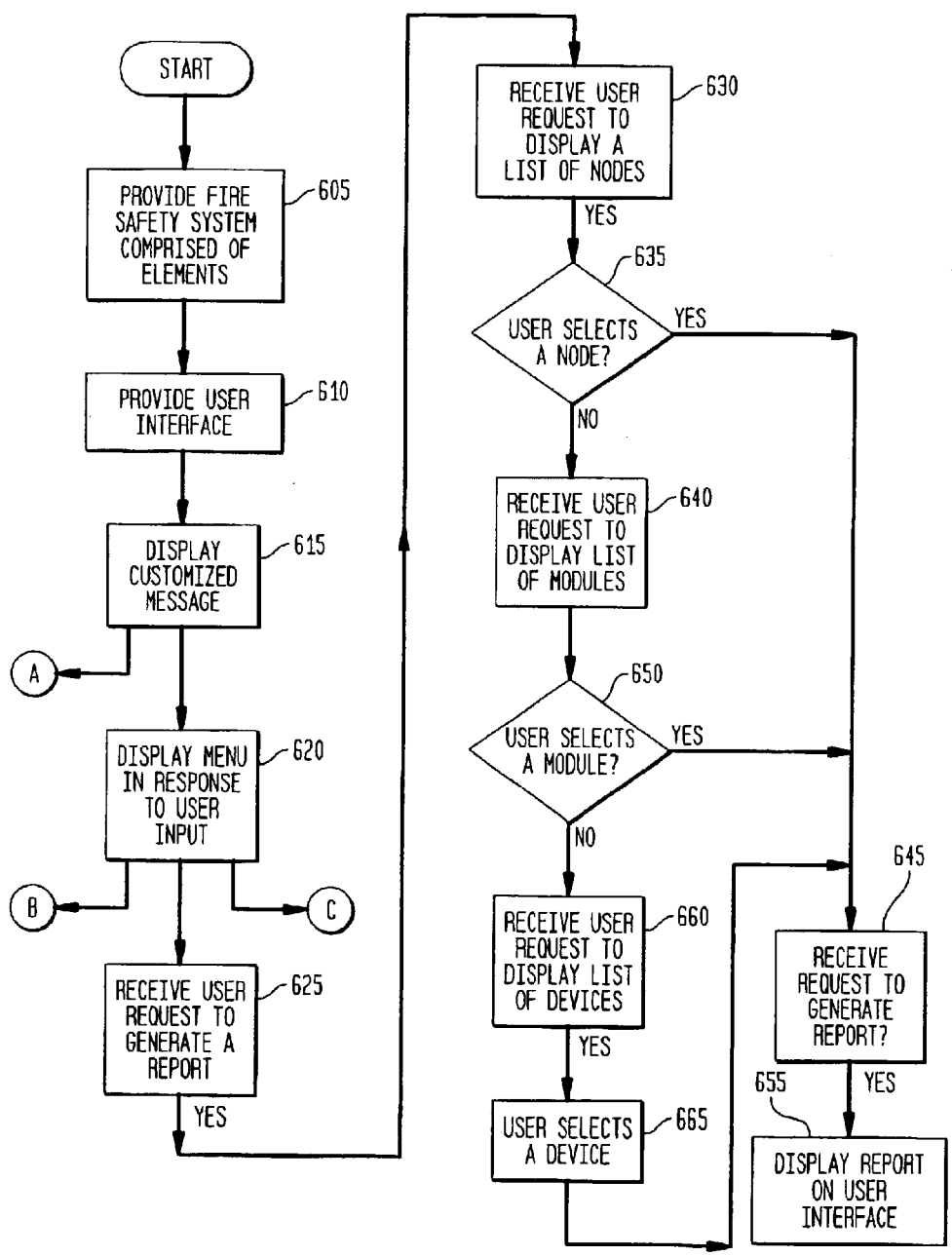
Figure 6B:
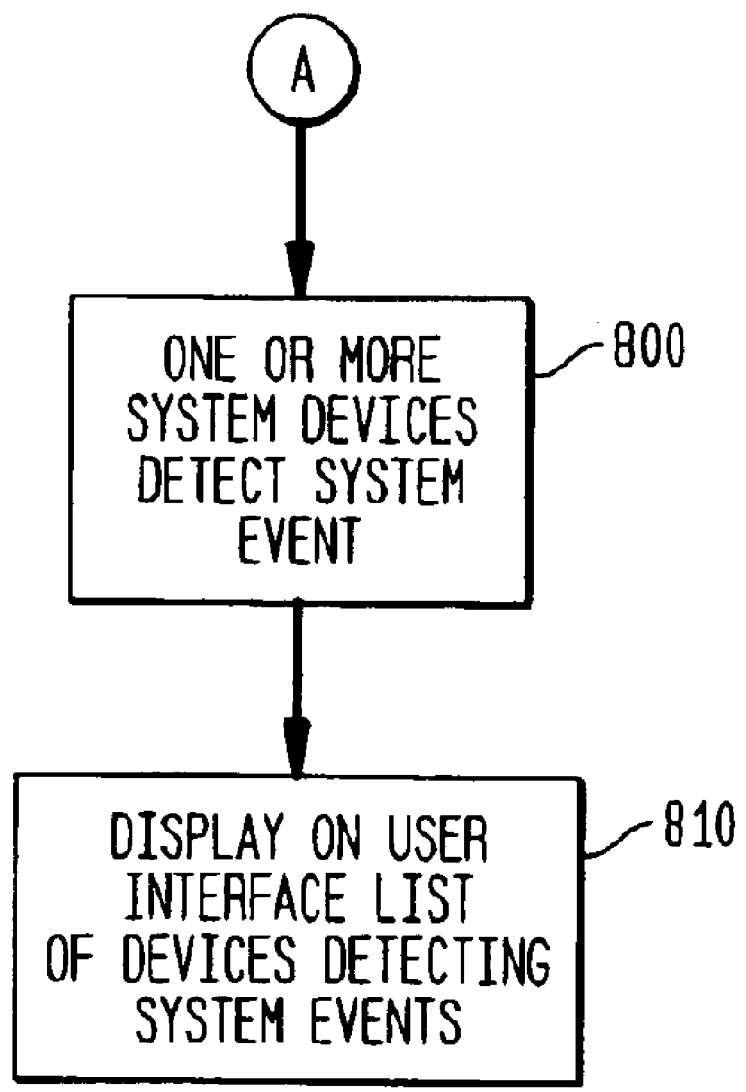
Figure 6C:
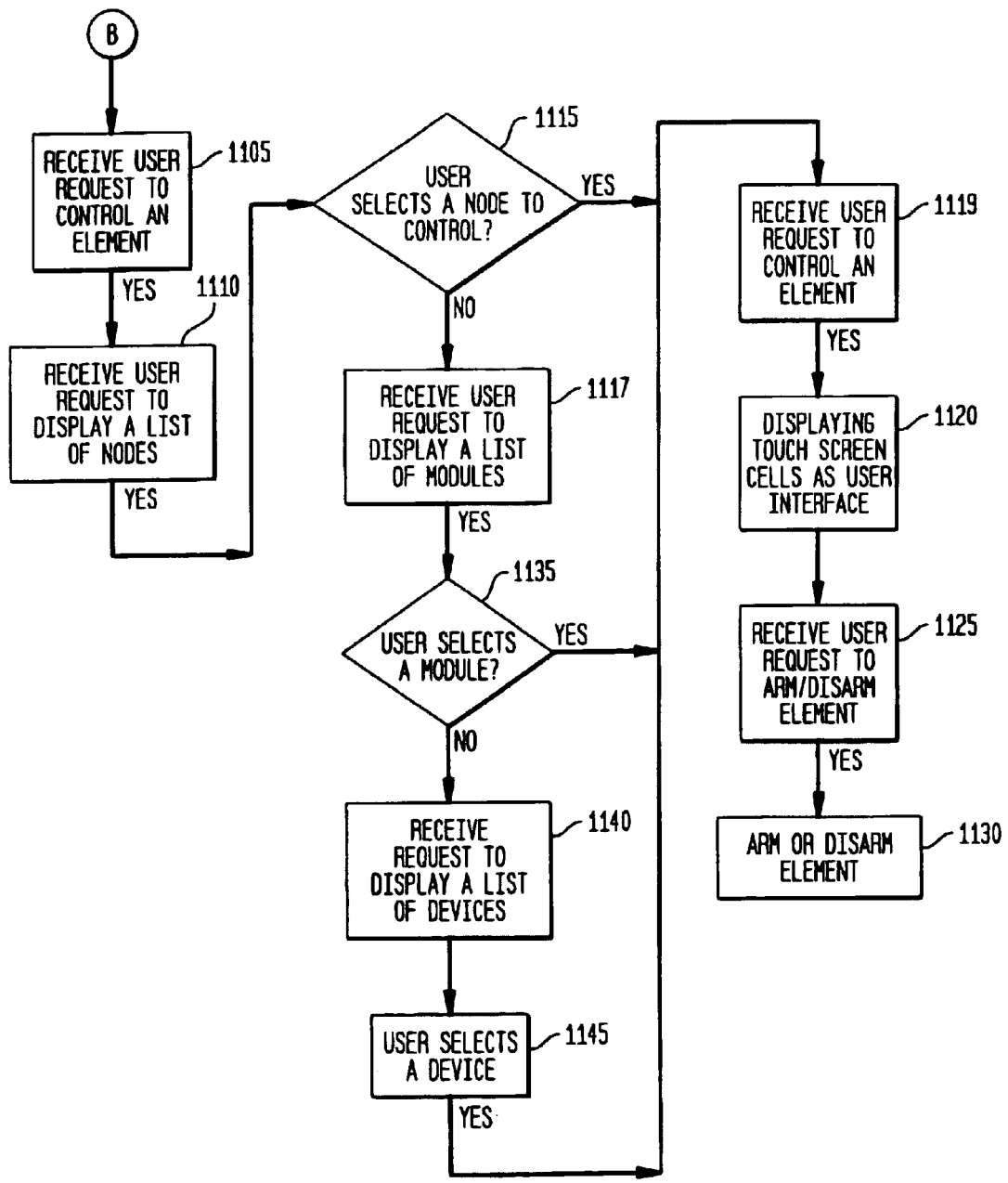
Figure 6E:
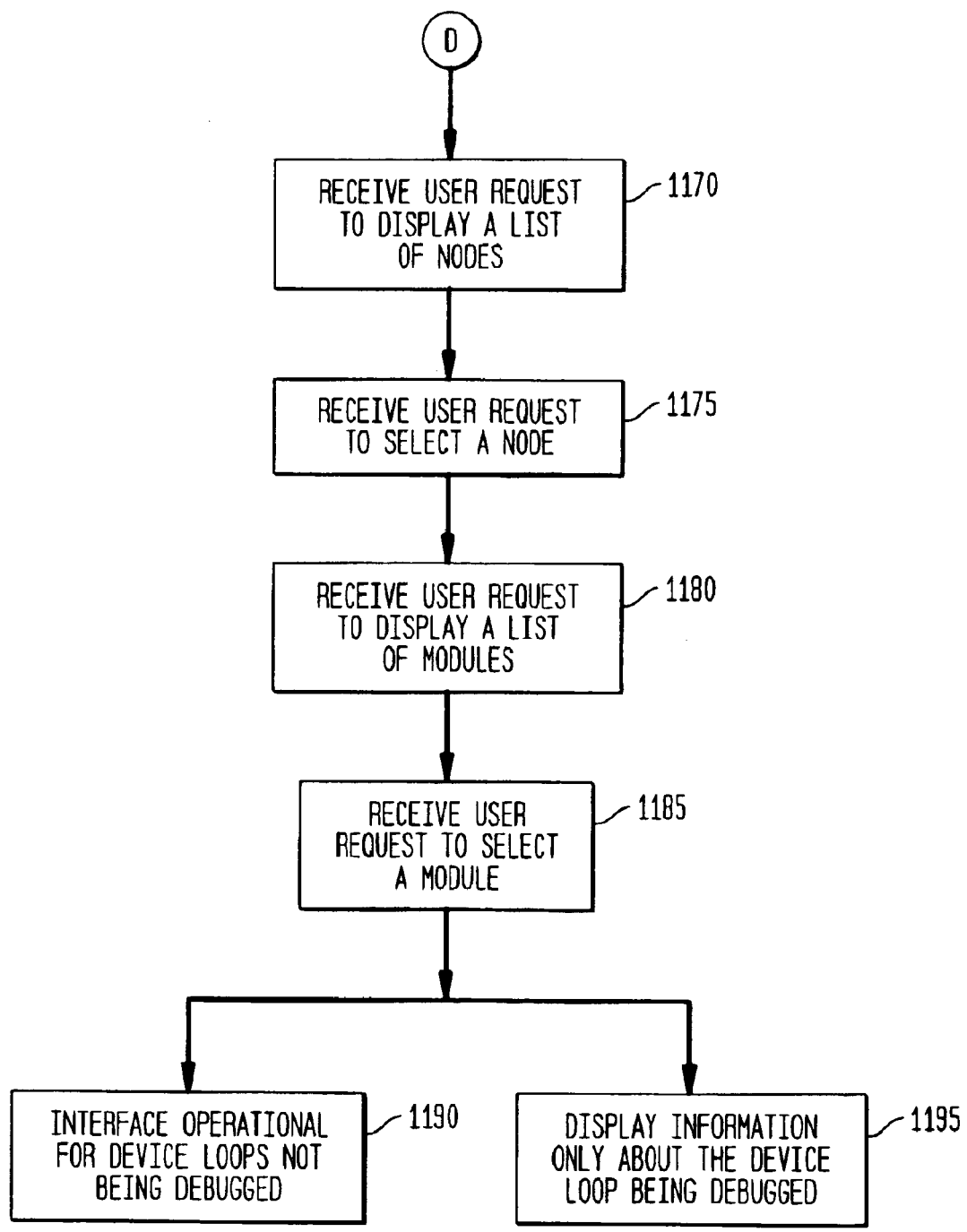

As previously noted, the present invention provides a user interface for a control panel for a fire safety system that can be used by individuals who have varying levels of training in using the control panel. FIGS. 6A–6C for a flowchart helpful in understanding the operation of a user interface of a fire safety system. FIG 6A. discloses the report mode, FIG. 6B discloses the alarm mode, FIG. 6C discloses the maintenance mode and FIG. 6D discloses the installation mode. FIG. 6E is a flowchart of a method for using the interface for the fire safety system to display system events detected by devices in the fire safety systems to generate reports about elements in the fire safety system, to perform maintenance on devices on elements in the fire safety system, and to install elements in the fire safety system.

At step 605, a fire safety system shown in FIGS. 1–4 is provided comprising a plurality of system elements to be controlled by the fire safety system. In a preferred embodiment, the system elements are comprised of system nodes, system modules and system devices.

At step 610, a user interface shown in FIGS. 1–4 is provided for displaying information about the fire safety system and for controlling elements in the fire safety system.

Figure 7:
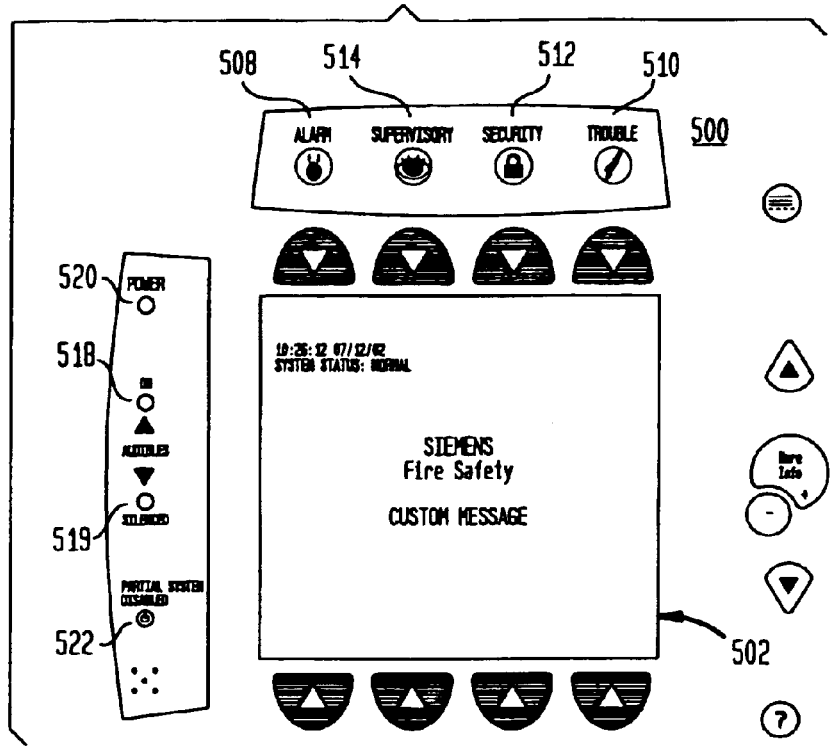
FIG. 7 illustrates a customized message being displayed on the user interface.

At step 615, a customized message is displayed on the user interface. As shown in FIG. 7. when the fire safety system is operating in its normal mode, and no system events are occurring, the display 502 of the user interface 500 may include a message indicating that the system status is normal, information such as times and date, or any other customized message desired. The message displayed on the display 502 may be customized to meet the needs of users not familiar with the user interface 502. The alarm LED 508, trouble LED 510, security LED 512 and supervisory LED 514 are off and the internal audible is off. The power LED 520 glows steady green in Normal mode when the System has AC power.

Figure 8:
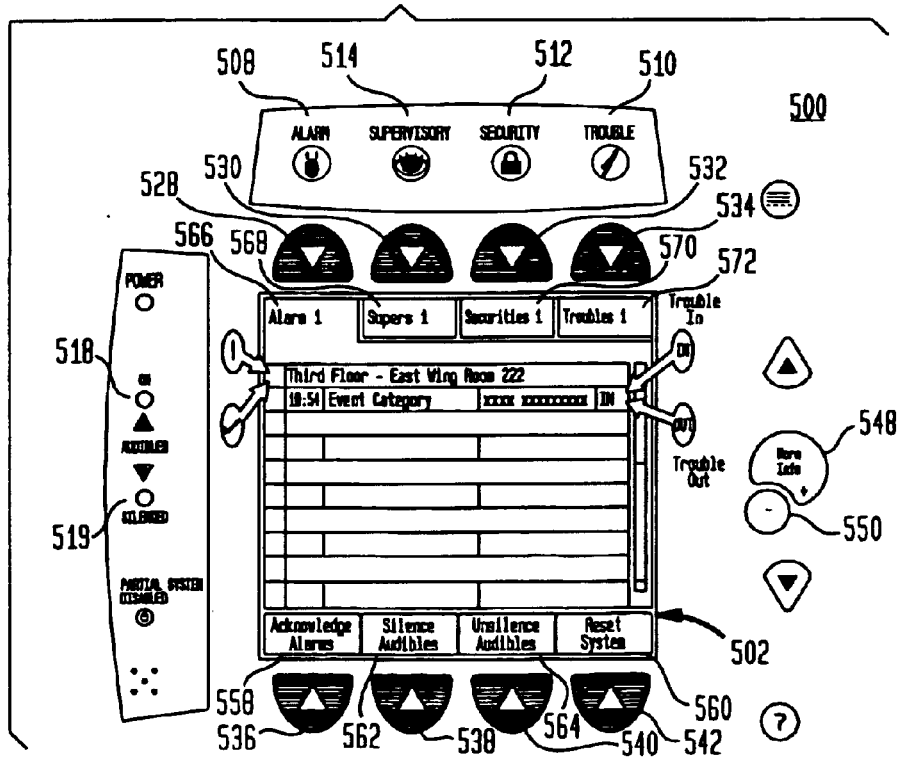
FIG. 8 illustrates a system event being displayed on the user interface.

At step 800 (FIG. 6B), the system of the present invention detects a system event, such as an alarm event, a supervisory event, a security event or a trouble event. At step 810, a list of devices detecting systems events is displayed on the user interface. Referring to FIG. 8, when an event occurs in the system, the display 502 of the interface 500 enters the Alert mode automatically. The events are displayed on the display 502 in priority order (Alarm, Supervisory, Security, and Trouble), the local audible sounds and the appropriate LED 508, 510, 512 and/or 514 blinks. If the event caused notification appliances to sound, the Audibles ON LED 518 indicator lights. At the bottom of the display 500 an acknowledge alarms tab 558 is displayed. A user may acknowledge the event by pressing key 536 located beneath the acknowledge tab 558, which will silence the local audible. The blinking exclamation point (!) then changes to a check mark (✓).

When a system event occurs, an alarm tab 566, a supervisory tab 568, a securities tab 570 and a trouble tab 572 appear. As a default, when more than one type of system event occurs, the type of system event with the highest priority will be displayed. A user may obtain information about supervisory events by pressing key 530 located above the supervisory tab 568. A user may obtain information about security events by pressing key 532 located above the securities tab 570. Finally, a user may obtain information about trouble events by pressing the key 534 above the trouble tab 572. In this way, using keys 528, 530, 532 and 534 a user may obtain information about a desired type of system event.

Once all events are acknowledged a Reset System tab 560 is displayed. A user may reset the system by pressing key 542 below the tab 560. If notification appliances are active, a silence audible tab 562 and an unsilence audible tab 564 are displayed at the bottom of the display 500. Using keys 538 and 540 located below tabs 562 and 564, the operator may silence or unsilence the notification appliances. When the notification appliances are silenced the Audibles Silenced LED 519 lights.

Figure 10:
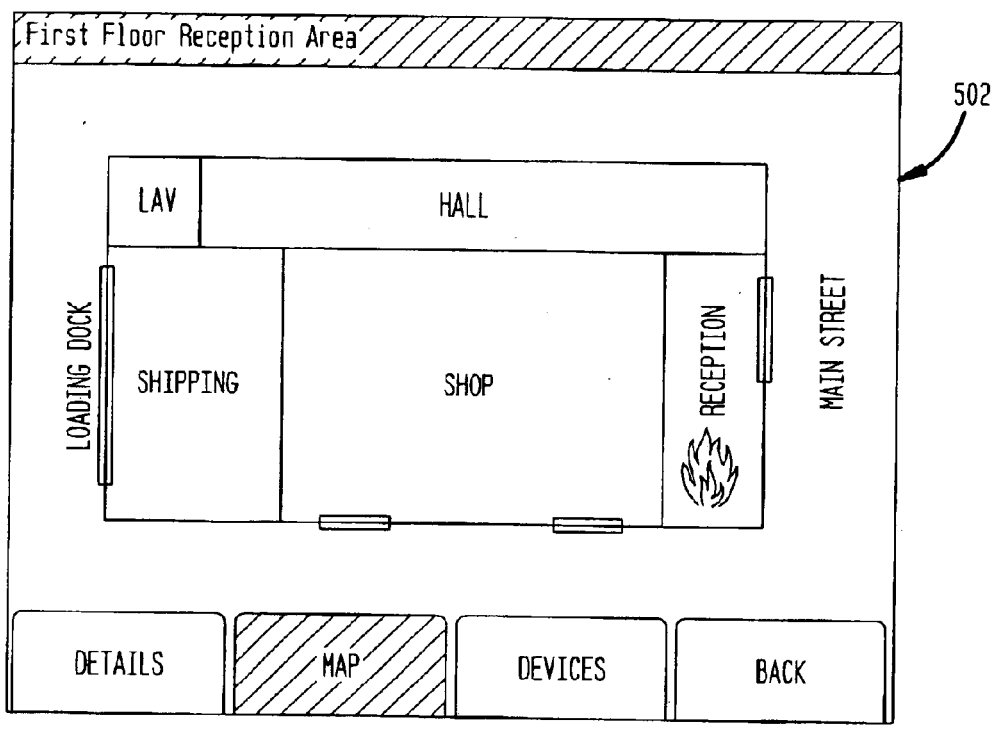
FIG. 10 illustrates a map display after a user request to display a map showing the location of a system event.

By pressing the More Info/+button 548, a user may display a screen, as shown in FIG. 9, showing details relating to the selected event. As shown in FIG. 9, information displayed on display 502 may include the location of the alarm, the types of devices in the system detecting a system event, a contact person, area fire equipment, and information about the area where the alarm is located, such as whether the area is handicap accessible and whether there are hazardous materials located. For fire fighters responding to the system, standard NFPA Fire Service icons are presented to alert fire fighters to the availability of fire service equipment (stand pipe locations, sprinklers, building fire hoses, fire hydrants, etc.). Standard Haz Mat icons are also presented to notify responding officials of possible hazards or people in that area of the building. Standard NFPA 704 Hazard rating icons can also be used. Other buttons also appear at the bottom of this screen, including button 538 that displays a map of the area in which the event occurred, and button 540 which allows the user to obtain further information about the devices that have detected an alarm event. By pressing button 538, a map such as shown in FIG. 10 is displayed showing where in a geographic location a system event has been detected. Referring to FIG. 8, the operator can return to the previous screen by pressing the More Info/-key 550, which is adjacent to the More Info/+key 548.

Referring again to FIG. 8, when the system detects an alarm, the red Alarm LED 508 blinks, the system's internal audible sounds steady, the Audibles On LED 518 glows and the alarm event displays on the display 502 with a blinking exclamation mark (!). Referring to table 1, the event listing displays the Event Custom Message, the Time of the event occurrence and the Alarm Event Category. In addition, the System responds to alarms with other output functions such as other audible signals.

TABLE 1

| Category | Physical Device |
| --- | --- |
| SMOKE | HFP-11, HZM, or CDC Zone |
| HEAT | HFTP-11, TRI, CDC Zone, HZM, SIM-16 Input |
| MANUAL | HMS, HTRI, SIM-16 Input, CDC Zone, HZM |
| CONV. ZONE | CDC Zone or HZM (for mixed device useage on a conventional zone) |
| WATERFLOW | HTRI, HZM, SIM-16 |

When the system detects one ore more supervisory event, the yellow Supervisory LED 514 blinks, the system's internal audible pulses, and the event(s) display on the display 502 with a blinking exclamation mark (!). In a preferred embodiment, this event listing displays the Event Custom Message, the Time of the event occurrence and the Supervisory Event Category (i.e., Tamper, Sprinkler, etc.). In addition, the system may respond to supervisory events with other output functions. An Acknowledge Supervisory tab 558 is displayed in the bottom left corner of the display 502. A user can acknowledge these events and silence the local audible by pressing button 536 below the tab 558. The blinking exclamation point (!) then changes to a check mark (☐).

When the system detects one or more security events, the yellow Security LED 512 blinks, the system's internal audible pulses, and the event(s) display on the display 502 with a blinking exclamation mark (!). This event listing displays the Event Custom Message, the Time of the event occurrence and the Security Event Category (i.e., Door, Monitor Point, etc.). In addition, the system may respond to securities events with other output functions. An Acknowledge Security tab 558 displays in the bottom left corner of the display 502. A user can acknowledge these events and silence the local audible by pressing button 536 below the tab 558. The blinking exclamation point (!) then changes to a check mark (☐).

When the system detects one or more trouble events, the yellow Trouble LED 510 blinks, the system's internal audible pulses, and the event(s) display on the display 502 with a blinking exclamation mark (!). This event listing displays the Event Custom Message, the Time of the event occurrence and the Trouble Event Category, as shown in table 2. In addition, the system responds to troubles with other output functions. An Acknowledge Security tab 558 displays in the bottom left corner of the display 502. A user can acknowledge these events and silence the local audible by pressing button 538 below the tab 562. The blinking exclamation point (!) then changes to a check mark (☐).

TABLE 2

| Category | Physical Device |
| --- | --- |
| DEVICE | Any supervised input device or zone/circuit trouble report: HFP-11, HTRI, HMS, SIM-16 individually supervised circuits. |
| ZONE | CDC zones, ZIC zones, ZAC zones, ZAM zone, HZM, HCP |
| MODULE | Any supervised module trouble-user interface, DLC, ZIC, CRC, CDC, PSC, NIC |
| SYSTEM | Any system-related trouble/failures that are not pinpointed to a specific module, zone or device |
| NETWORK | Any Network-related trouble/failure that is not pinpointed to a specific System (i.e., |

TABLE 2-continued

| Category | Physical Device |
| --- | --- |
|  | NCC Communication Failure, Mode 4 Comm. Fail, etc.) |

Figure 11:
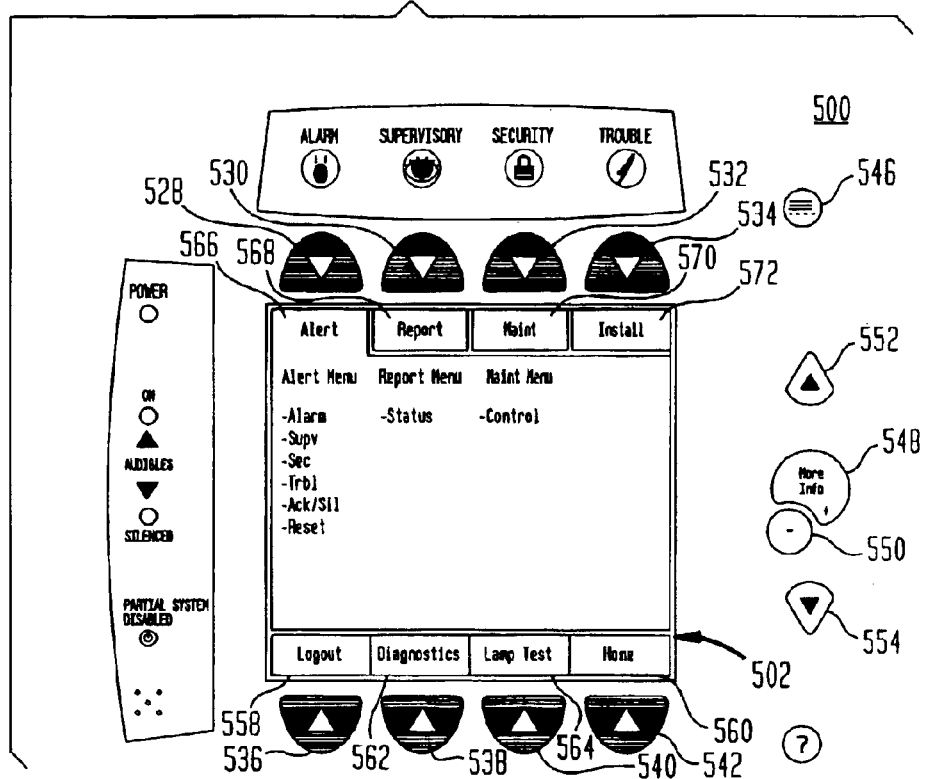
FIG. 11 illustrates the display after a user request to display a menu.

At step 620, in situations where no system events have been detected, and as shown in FIG. 11, a menu is displayed on the display 502 of the user interface 500 in response to a user input. If a user presses the More info/+button 548, a menu of all interface options is displayed on the display 500. In response to a user input, a plurality of tabs representing user options will be displayed. Preferably, the tabs will represent the interface's 500 alert mode 566, report mode 568, maintenance mode 570 or the installation mode 572. Pressing key 528 will allow a user to select the alert mode 566. Pressing key 530 will allow a user to select the report mode 568. Pressing key 570 will allow a user to select the maintenance mode 570, and pressing key 534 will allow a user to select the installation mode 572. Tabs 558, 562, 564 and 560 give users the options of logging out, conducting diagnostics, conducting a lamp test and going home using keys 536, 538, 540 and 542 respectively. In an alternative embodiment, any of the tabs shown in display 502 may be provided on a touch screen 504 which will allow the user to select a tab by touching the area of the touch screen 504 over the tab.

At step 625 (FIG. 6A), a user may generate one or more reports by selecting the report option by pressing button 530 (FIG. 11). A user may navigate to the desired node, module or device by pressing the More Info/+button 548 one or more times. For example, at step 630 a user may display a list of system nodes by pressing the More Info/+button 548 once. At step 635, the user may then use the up button 552 and down buttons 554 to select the desired node. The user then has the option of generating a report about the node or obtaining further information about modules located within the node.

If the user decides to display a list of modules for a selected node, at step 640 the user may display a list of system modules for a selected node by pressing the More Info/+button 548 again. The user may then use the up button 552 and down buttons 554 to select the desired module.

At step 645, if the user selects to generate a report about a selected node, a status tab is displayed and a user may select the status tab by pressing the key located below the displayed status tab. An area in the touch screen 504 of the display 502 may then be displayed labeled "sensitivities" which will allow the user to touch the area of the touch screen 504. This will highlight the area to indicate that it has been selected. A user can then select an Execute tab by pressing the key located below the execute tab. As the system reads all device sensitivities for the module/loop or device it displays the message Acquiring Data. At step 645, when the data is received, the data is displayed on display 502. This sensitivity report can then be printed by selecting the Print option.

At step 650, if the user at step 640 had decided to display a list of modules instead of generating a report about a selected module, the user now has the option of displaying a list of devices or generating a report about a module.

If the user decides to display a list of devices for a selected module, at step 660 the user may display a list of system modules for a selected node by pressing the More Info/+button 548 again. The user may then use the up button 552 and down button 554 to select the desired module.

Figure 12:
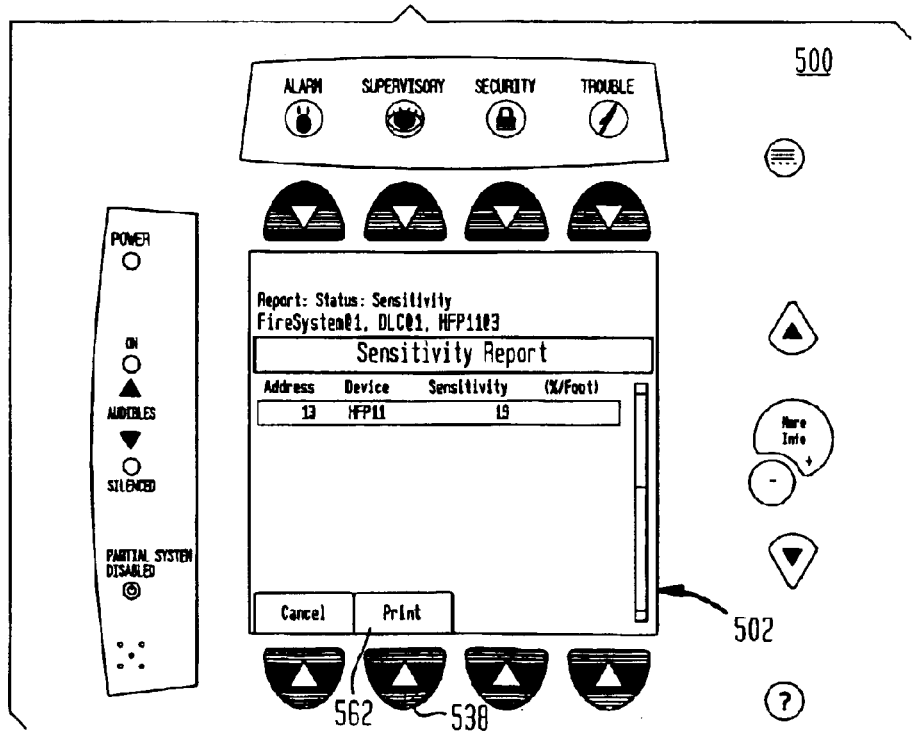
FIG. 12 illustrates a device sensitivity report being displayed on the user interface.

If the user decides to generate a report about a selected device during step 665, at step 645 a status tab is displayed and a user may select the status tab by pressing the key located below the displayed status tab. An area in the touch screen 504 of the display 502 may then be displayed labeled "sensitivities" which will allow the user to touch the area of the touch screen 504. This will highlight the area to indicate that it has been selected. A user can then select an Execute tab by pressing the key located below the execute tab. As the system reads all device sensitivities for the device it displays the message Acquiring Data. At step 655, when the data is received, it displays the data on the interface display. As shown for example in FIG. 12, the sensitivity report displayed on display 502 of the interface 500 will include information such as the address of the device, the type of device, 621 and the sensititivity of the device. This sensitivity report can then be printed by selecting the Print tab 562 by pressing key 538.

Figure 13:
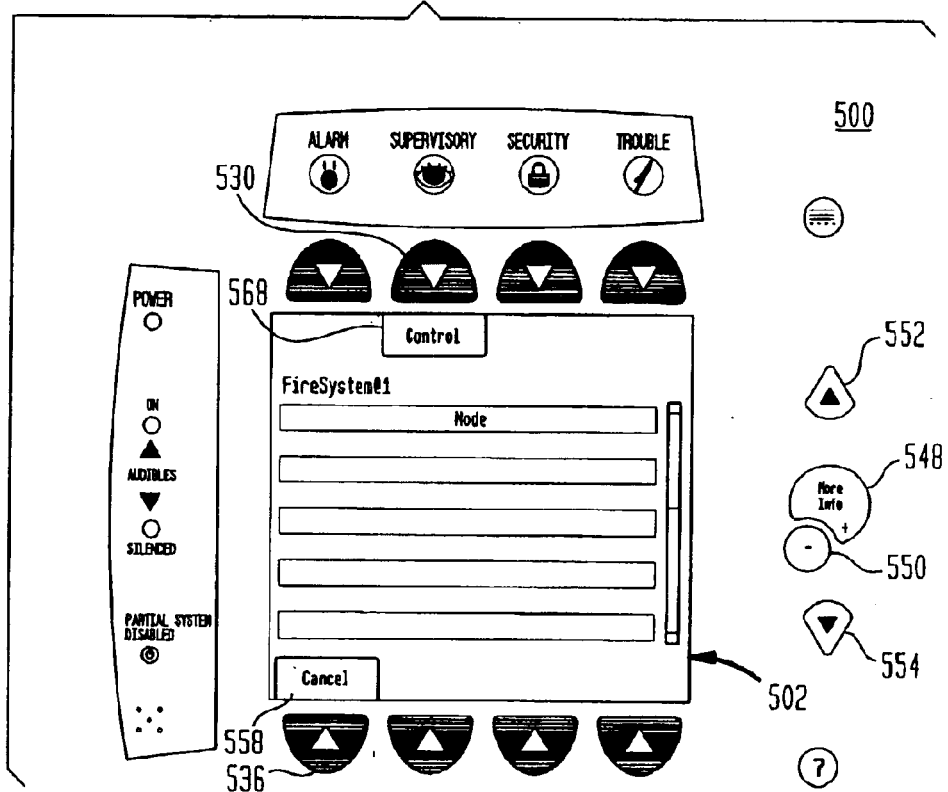
FIG. 13 illustrates a list of system nodes being displayed in response to a user request.

In a preferred embodiment, a user may also use the interface to perform maintenance on the system. At step 1105 (FIG. 6C) the user may select the Maintenance option by pressing key 532, as shown in FIG. 11. A user may navigate to the desired node, module or device using the More Info/+button 548 on the interface 500. In step 1105, and as shown in FIG. 13, the user may display a list of system nodes by pressing the More Info/+button 548. The user may then use the up 552 and down 554 buttons to select the desired node. The user at this point has the option of entering a request to control the node, or to display a list of modules within the selected module.

In step 1117, if the user selected to display a list of system modules by again pressing the More Info/+button 548, the user may use the up button 552 and down buttons 554 to select the desired module.

Figure 14:
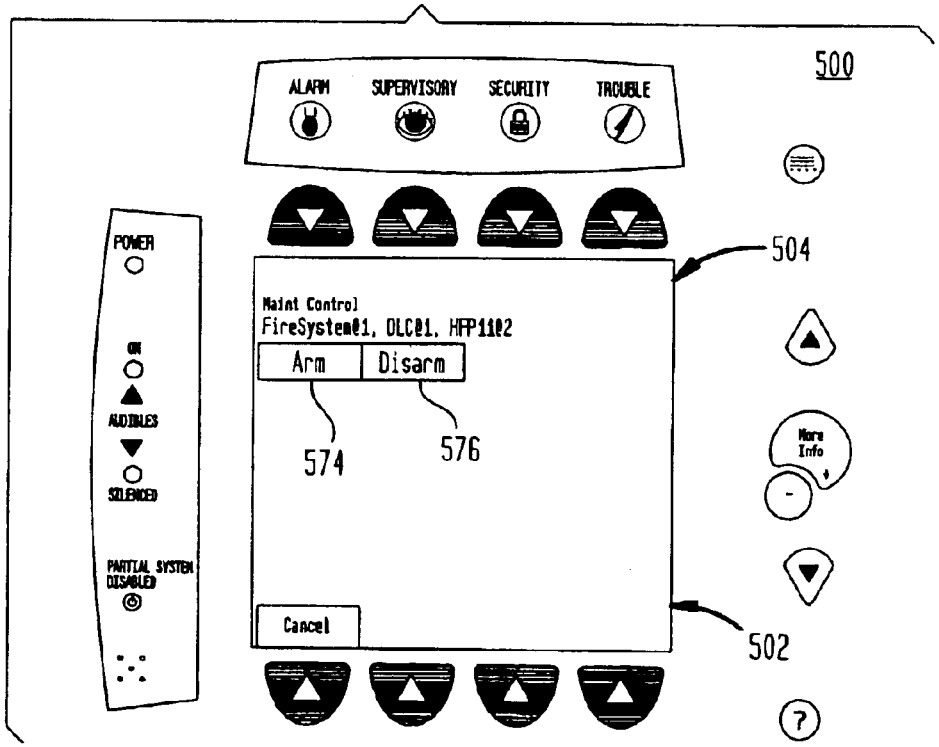
FIG. 14 illustrates touch screen cells being displayed allowing a user to arm or disarm a system node.

In step 1119, if a user wishes to control the node displayed on display 502 of user interface 500, the user may select the Control option 528 by pressing key 530. At this point, as shown in FIG. 14, touch screen cells 574 and 576 on touch screen 504 are displayed on display 502 of interface 500 which provide the user with the option of arming or disarming the selected node. In step 1120, in order to arm or disarm a node, a user may touch the touch screen cell 574 labeled Arm or the touch screen cell 576 labeled Disarm. In step 1125, once a user has touched a screen cell indicating a desire to arm or disarm a node, the cell 574 or 576 will be highlighted on the screen to indicate that it has been selected. In step 1130, the interface 500 will then arm or disarm the node based upon the users selected input.

Figure 15:
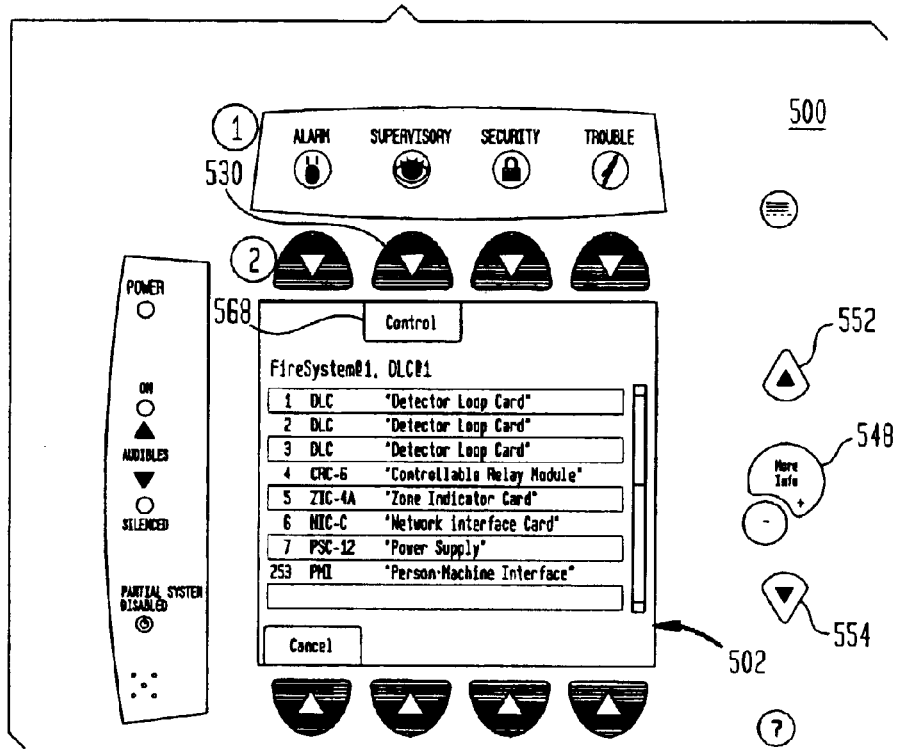
FIG. 15 illustrates a list of system modules being displayed in response to a user request.

In step 1135, and referring to FIG. 15, if a user has opted to display a list of modules by pressing key 548, instead of selecting to control a node, a list of modules will be displayed on the display 502 of the interface 500. The user has the option at this point of controlling a selected module or displaying a list of devices controlled by a module. The user may select a module using the up button 552 and down button 554 to scroll through the list of displayed modules.

Figure 16:
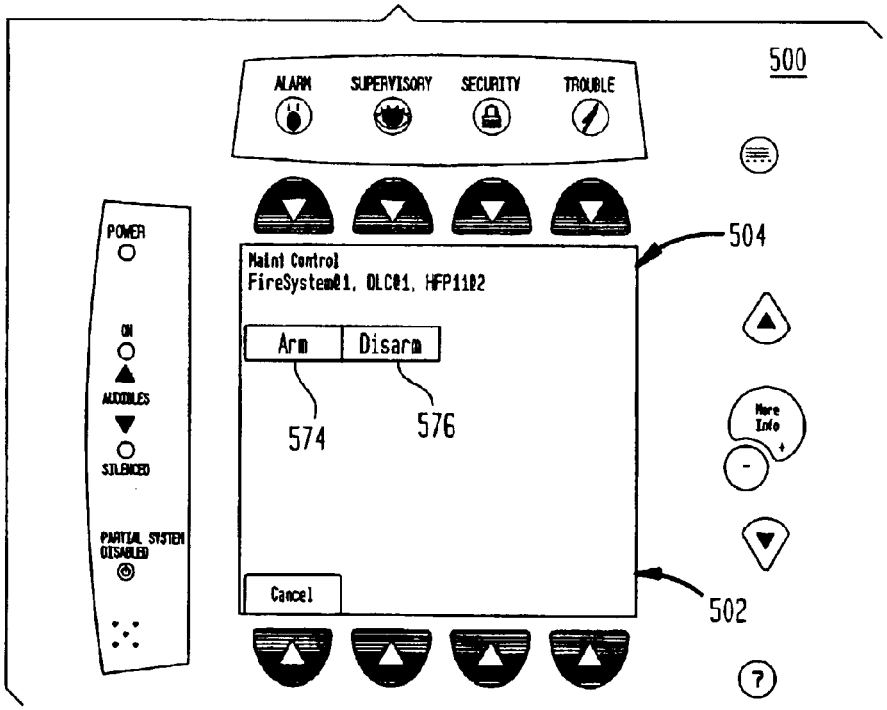
FIG. 16 illustrates touch screen cells being displayed allowing a user to arm or disarm a system module.

In step 1115, and referring again to FIG. 13, if a user wishes to control a module displayed on display 502 of user interface 500, the user may select the Control option 568 by pressing button 530. In step 1120, and as shown in FIG. 16, touch screen cells 574 and 576 of touch screen 504 are displayed on display 502 which provide the user with the option of arming or disarming the selected node. In step 1120, in order to arm or disarm an element, a user may touch the touch screen cell 574 labeled Arm or the touch screen cell 576 labeled Disarm. In step 1125, once a user has touched a screen cell indicating a desire to arm or disarm a module, the cell 574 or 576 will be highlighted on the screen to indicate that it has been selected. In step 1130, the interface 500 will then arm or disarm the node based upon the user input.

Figure 17:
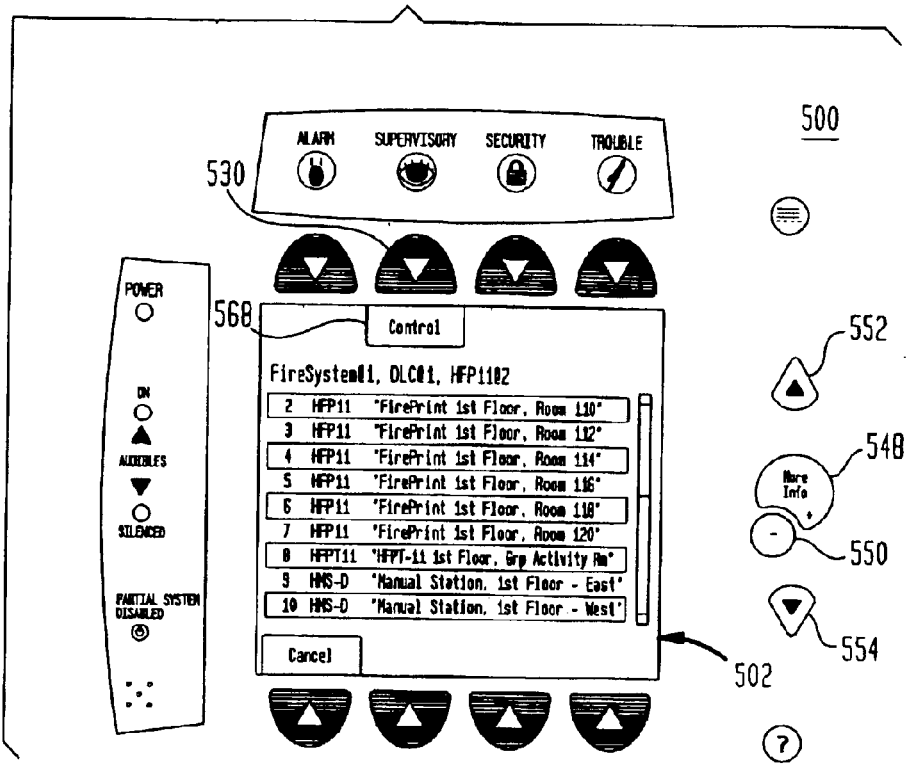
FIG. 17 illustrates a list of system devices being displayed in response to a user request.
Figure 18:
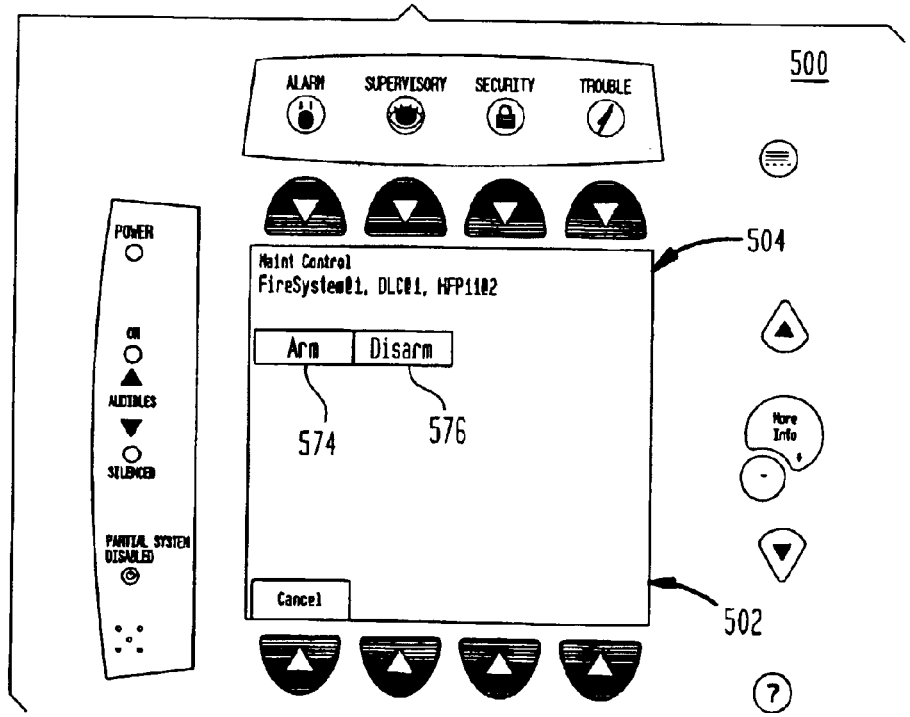
FIG. 18 illustrates touch screen cells being displayed allowing a user to arm or disarm a system device.

In step 1140, and referring to FIG. 17, if a user has opted to display a list of devices by again pressing key 548, instead of selecting to control a module, a list of devices will be displayed on the display 502 of the interface 500. In step 1145, using buttons 552 and 554, a user may select a device to control. In step 1145, and referring to FIG. 15, once a user has reached the desired device, the user may select the Control option by pressing the key 530 adjacent the Control Tab 568. To escape to a previous level, the user may use the key 550. In step 1120, as shown in FIG. 18, touch screen cells 574 and 576 of the touch screen 504 are displayed on display 502 of the interface 500 allowing the user the option of arming or disarming the selected device In step 1125, a user may user the control arm and disarm features to enable or disable the operation of devices, inputs including but not limited to Smoke/Photo, Thermal, Neural, Switch 1 and Switch 2, and outputs including but not limited to Relay 1, Relay 2, LED and Status LED. In order to arm or disarm a device, a user may touch the touch screen cell labeled Arm 574 or the touch screen cell Disarm 576. This will highlight the box to indicate that it has been selected As shown in FIG. 18, the line of text at the top of the display 502 of the interface 500 indicates the current level. For example, FireSystem @1, DLC @ 1, HPF11 @ 2 indicates:
FireSystem @ 1—Node 1 of the FireSystem
DLC @ 1—the DLC module at address 1
HPF11 @ 2—the HFP-11 detector at device address 2

Figure 19:
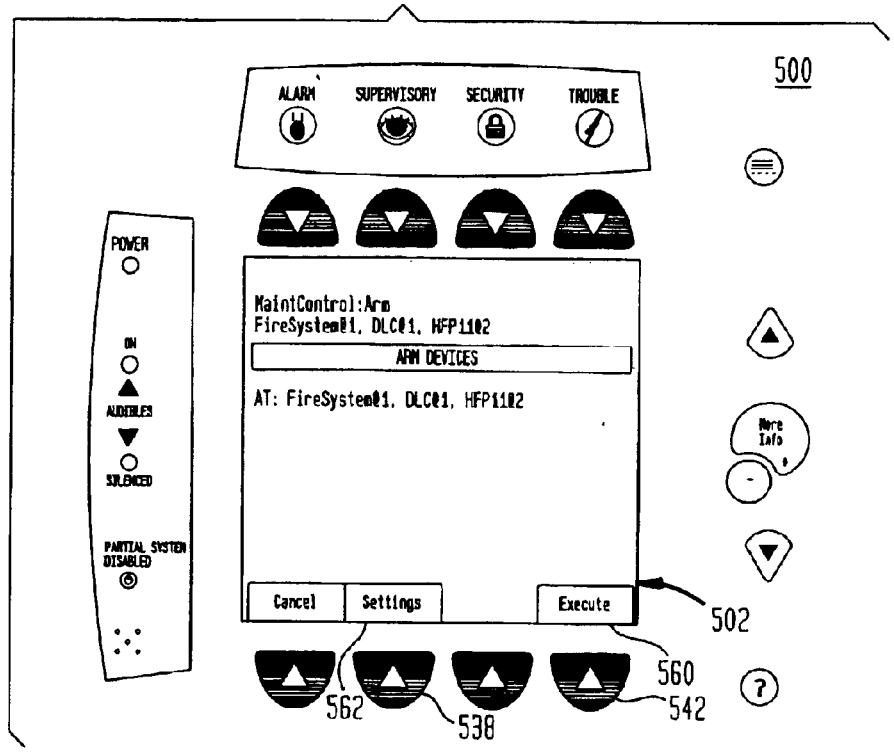
FIG. 19 illustrates a display after a user request to arm a device.

Referring to FIG. 18, if a user selects the arm touch screen cell 574 after the desired device level is reached, in FIG. 19 the Arm Devices screen display 500 of interface 502 shows the location of the device being armed in the system (In this example, AT: FireSystem @ 1, DLC @ 1, HFP11 @ 2). A user may arm all elements associated with the device by pressing the key 542 adjacent to the Execute tab 560. To select individual components associated with the device, the user may press the key 538 adjacent to the Settings tab 562.

Figure 20:
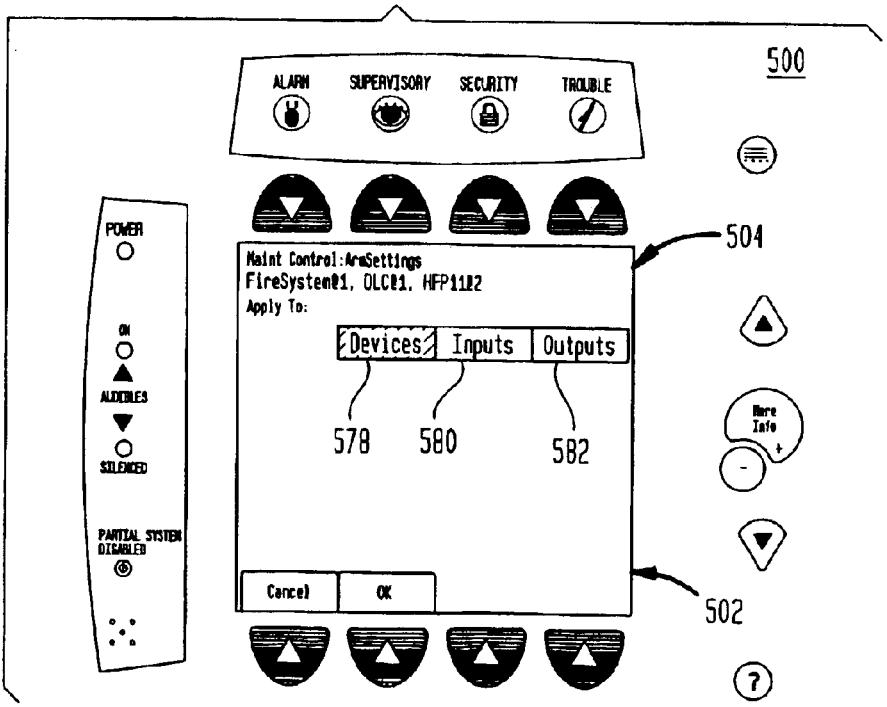
FIG. 20 illustrates a display after a user has inputted a request to set certain inputs and/or outputs of a device.

Referring to FIG. 20, if a user has selected to arm a device, touch screen cells 578, 580 and 582 of touch screen 504 are displayed on display 502 of interface 500 providing the user with the option of choosing to arm inputs using cell 580 or to arm outputs using cell 582. The screen shown in FIG. 20 is context-sensitive and will allow the user to select only those items which are applicable. A user may de-select an item by touching the cell 580 or 582 again.

Figure 21:
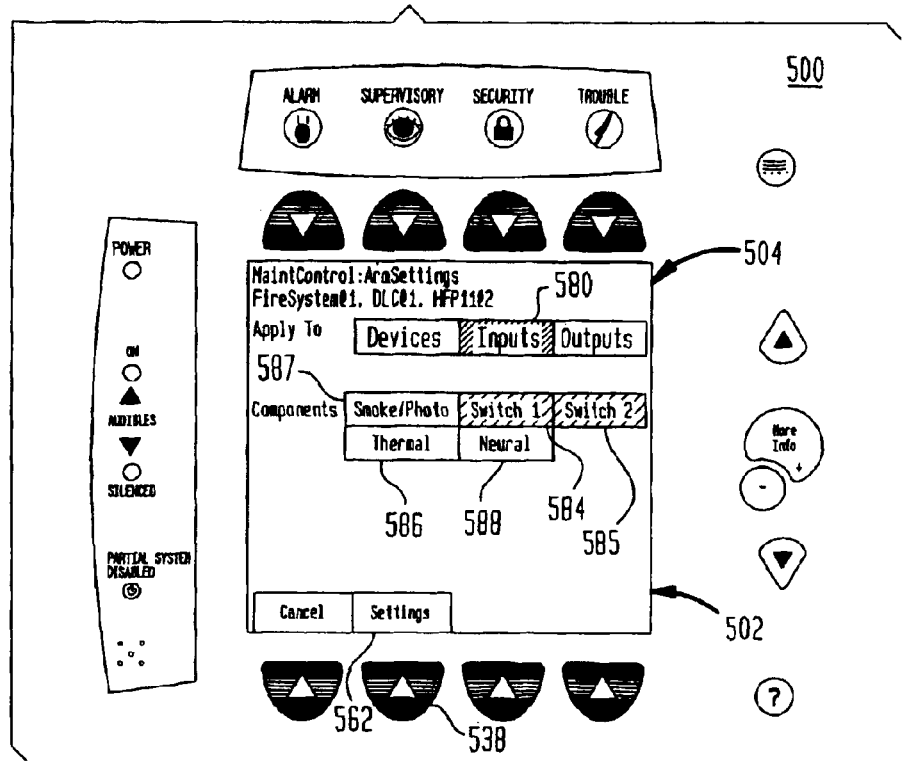
FIG. 21 illustrates a display having touch screen cells allowing a user to arm selected inputs of a device.

Referring to FIG. 21, when the inputs cell 580 is selected, the cell 580 is highlighted and one or more touch screen cells 584, 585, 586, 587 and 588 of the touch screen 504 are displayed on the display 502 of interface 500 representing components of an input. Items that cannot be selected are grayed out. For example, as shown in FIG. 21, cells 584 and 585 representing switches are grayed out. Using the touch screen 504 the user may make a selection of the components to be armed, such as by touching cells 586 and 587 representing a thermal component and a smoke/photo component. The user may then press the key 538 adjacent to the settings tab 562. In a preferred embodiment, the components that have been selected at this point have not yet been armed.

Figure 22:
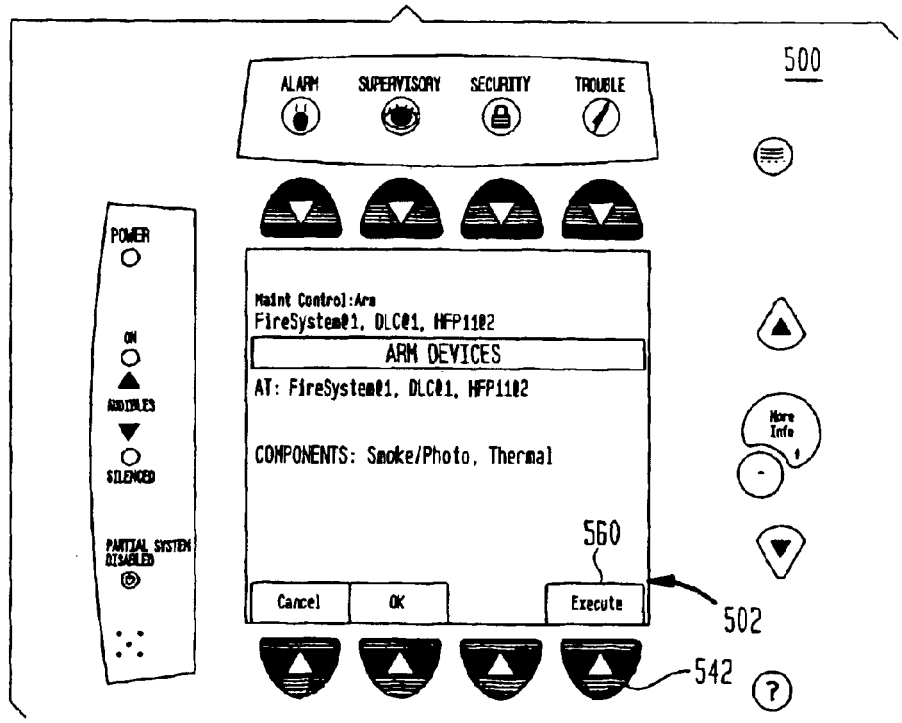
FIG. 22 illustrates a display after a user request to arm certain inputs of a device.

At this point, referring to FIG. 22, the display 502 of the interface 500 returns to display the text "Arm Devices". Components that were selected are listed in the Components section of the display 502. For example, FIG. 22 shows that the Smoke/Photo and Thermal components have been selected. A user may then press the key 542 adjacent to the Execute tab 560 to arm the selected components. The message Request Executing flashes on the display 502. If the device(s) are armed, the display 502 returns to the menu mode. If the request cannot be executed, the message Unable to Process is displayed on display 502.

Figure 23:
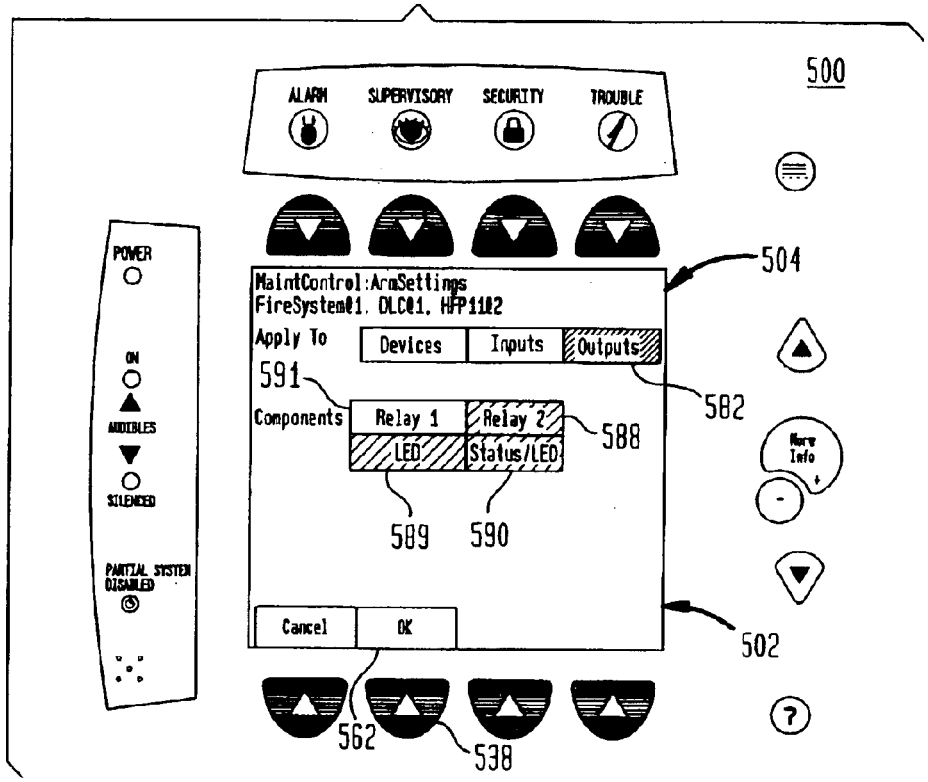
FIG. 23 illustrates display having touch screen cells allowing a user to arm selected outputs of a device.

Referring to FIGS. 20 and 23, when the outputs cell 582 of the touch screen 504 is selected, display 502 of interface 500 displays a components section comprised of a plurality of touch screens cells 588, 589, 590 and 591 representing outputs of a selected device. The touch screens cells representing output components that cannot be selected are grayed out. For example, as shown in FIG. 23, touch screen cells 588, 589 and 590 representing a relay, and LED and a status LED are grayed out. A user may then make a selection of the output components desired to be armed by touching one of the touch screen cells, by pressing touch screen cell 591 for example, and may then press the key 538 adjacent to the OK tab 562. In a preferred embodiment, the components that have been selected at this point have not yet been armed.

Figure 24:
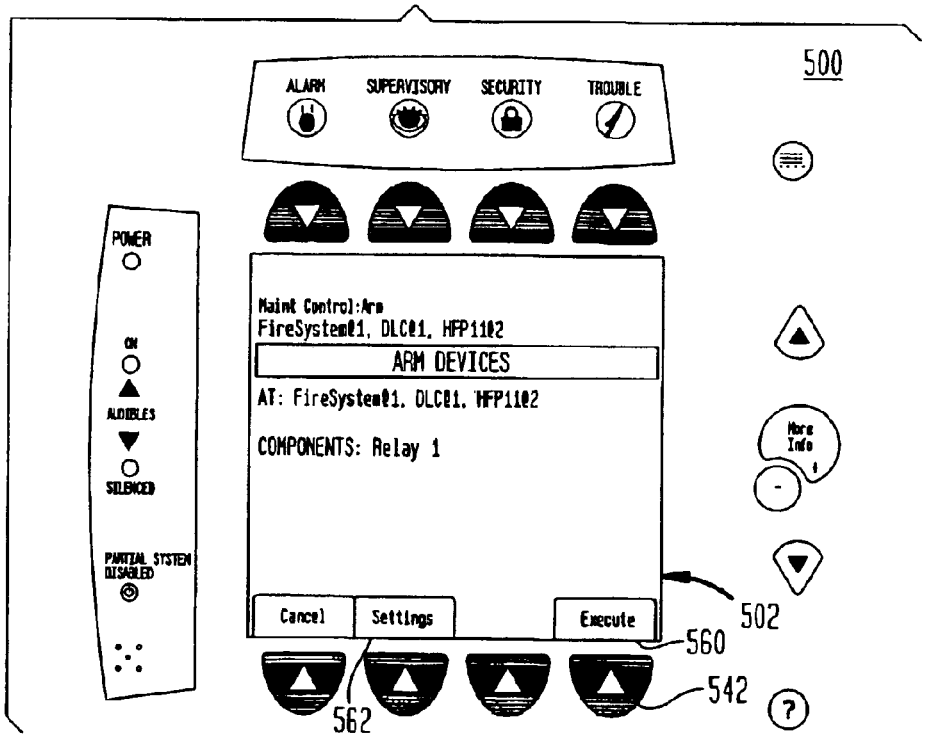
FIG. 24 illustrates a display after a user request to arm certain outputs of a device.

Referring to FIG. 24, the display 502 of interface 500 displays text indicating that a device has been armed. The selected components are displayed on display 502. For example, if touch screen cell 591 representing Relay 1 was touched, then Relay 1 will be displayed on display 502. The user may then press the key 542 adjacent to the Execute tab 560 to arm the selected component. The message Request Executing flashes on the display 502. If the device(s) are armed, the display 502 returns to the menu mode. If the request cannot be executed, the message Unable To Process is displayed on display 502.

Figure 25:
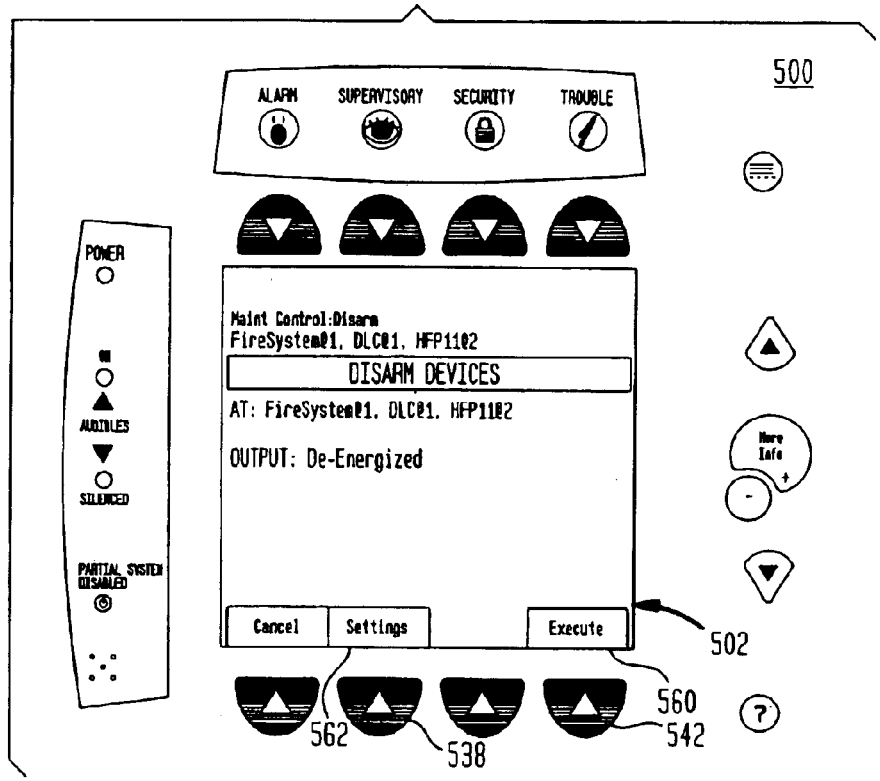
FIG. 25 illustrates a display after a user request to disarm a device.

Referring to FIG. 25, after a user has selected the disarm touch screen cell 576 in FIG. 18, the display 502 of interface 500 displays a message including the text "Disarm Devices" and shows the location of the device being disarmed. (In this example, AT: FireSystem @ 1, DLC @ 1, HFP11 @ 2). To disarm all components associated with the device, the user may press the key 542 adjacent to the Execute tab 560. A user may select individual components associated with the device by pressing the key 538 adjacent to the Settings tab 562.

Figure 26:
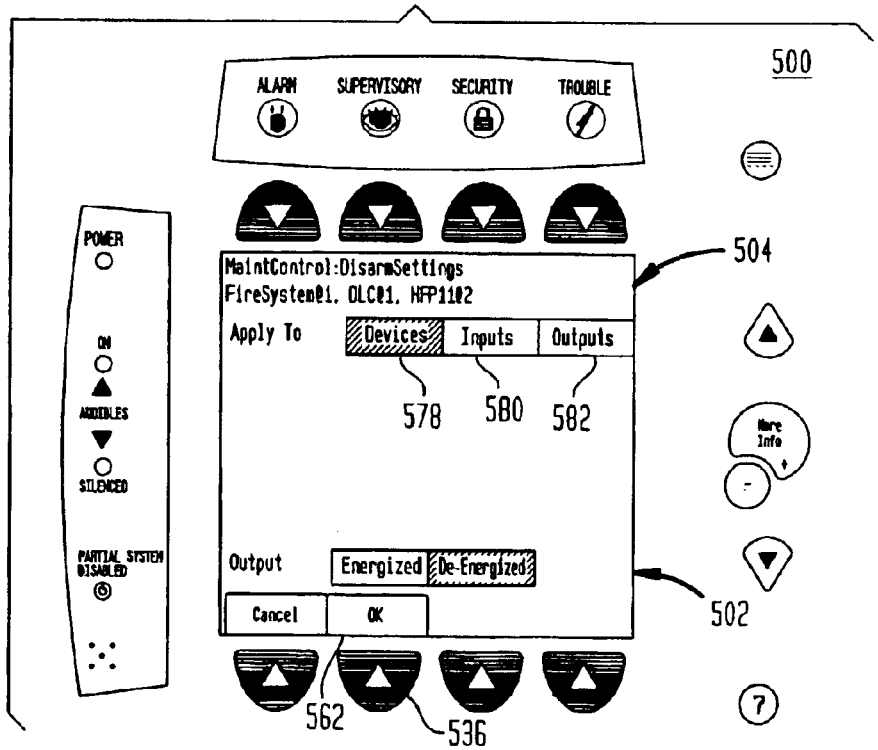
FIG. 26 illustrates a display after a user has inputted a request to disarm certain inputs and/or outputs of a device.

Referring to FIG. 26, if a user has selected to choose to disarm selected components of a device by pressing key 538, the display 502 is shown on interface 500. On display 502 the user is presented with touch screen cells 578, 580 and 582 on touch screen 504 which allow the user to select whether to disarm a device's inputs or outputs. Touch screen cell 580 allows a user to disarm inputs, and touch screen cell 582 allows a user to disarm outputs. This touch screen 504 is context-sensitive and will allow the user to select only those items which are applicable. A user may de-select an item by touching the cell again. A user may finalize a selection by pressing the key 536 under the OK tab 562.

Figure 27:
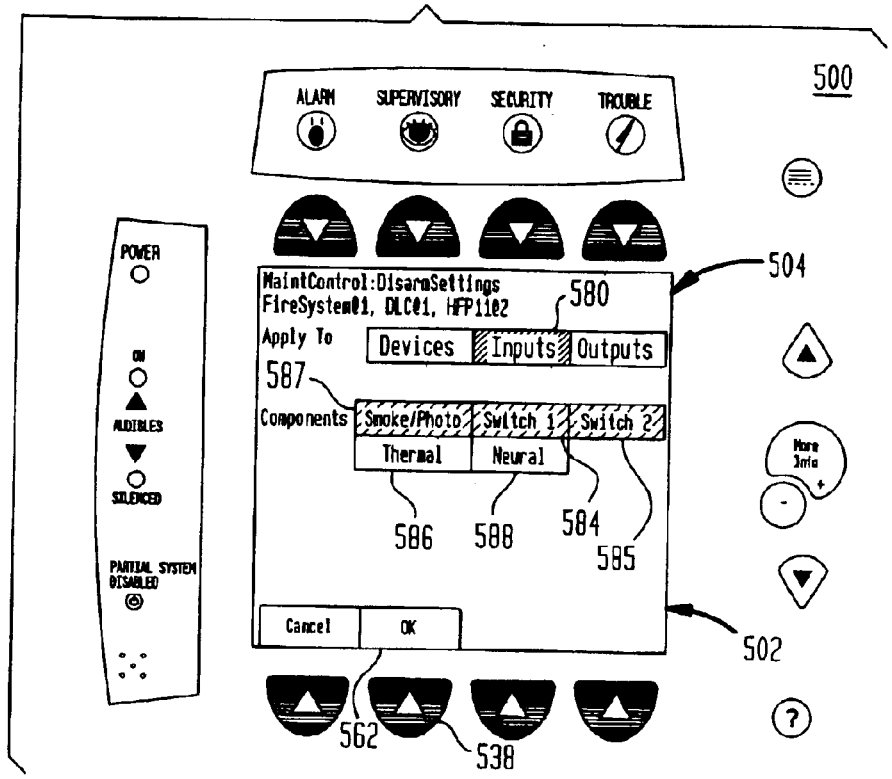
FIG. 27 illustrates a display having touch screen cells allowing a user to disarm selected inputs of a device.

Referring to FIG. 27, when the inputs cell 580 is selected, display 502 of interface 500 displays touch screen cells 584, 585, 586, 587 and 588 representing the cells that can be selected. Cells that cannot be selected are grayed out. For example, in FIG. 27, the touch screen cells 584 and 585 representing switches are grayed out. The user may then make a selection of the components wished to be disarmed by touching the representative touch screen cells, such as touch screen cells 587, and by then pressing key 538 located adjacent to OK tab 562. In a preferred embodiment, the components that have been selected at this point have not yet been armed.

Figure 28:
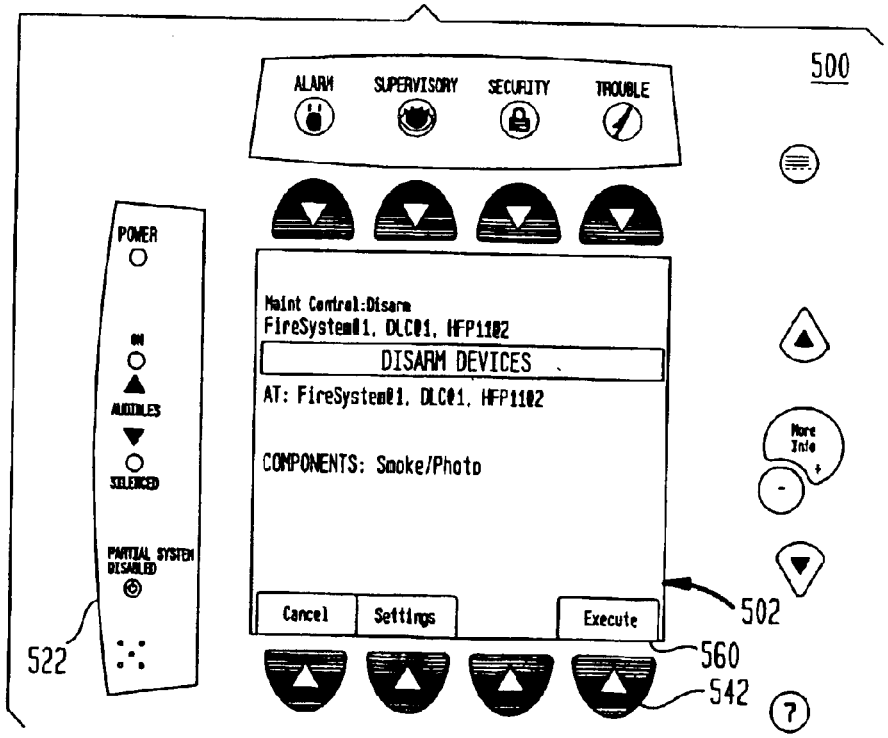
FIG. 28 illustrates a display after a user request to disarm certain inputs of a device.

Referring to FIG. 28, the display 502 of the interface 500 then returns to display the message "Disarm Devices". This time the components that were selected are listed in the components section of the display 502. The user may then press the key 542 adjacent to the Execute tab 560 to disarm the selected components. If a module(s) or device(s) are disarmed, a trouble reports on the system indicating exactly what has been disarmed and the Partial System Disable LED 522 glows steady yellow.

Figure 29:
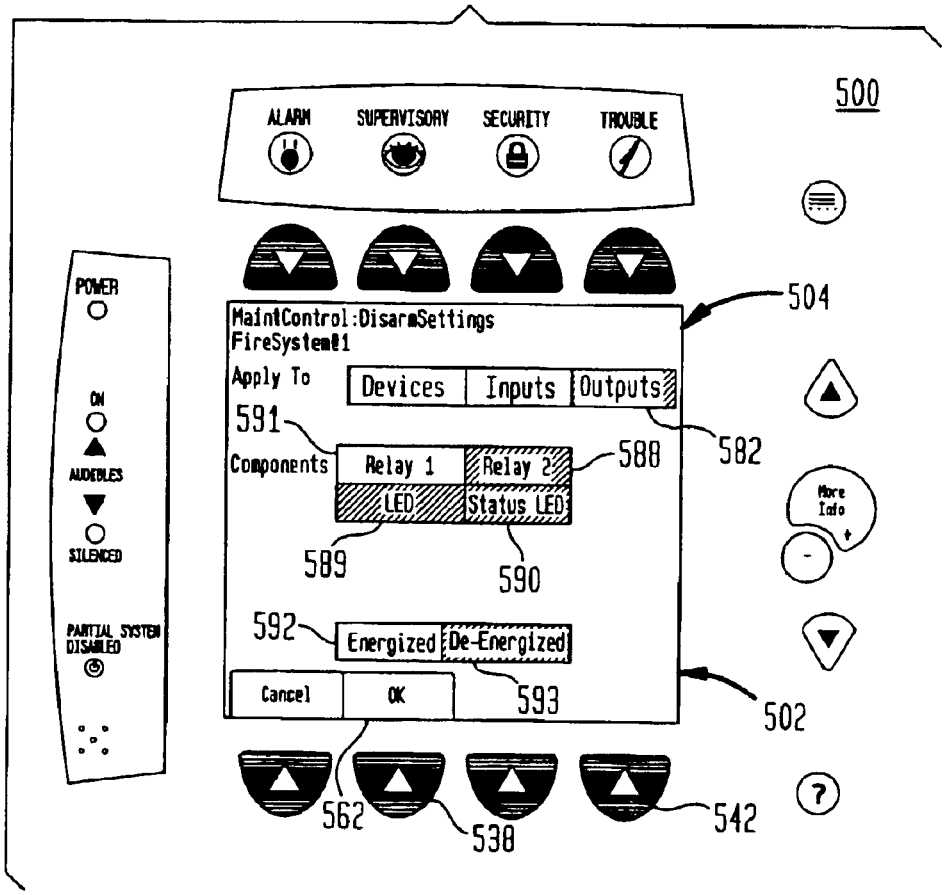
FIG. 29 illustrates a display having touch screen cells allowing a user to disarm selected outputs of a device.

Referring to FIG. 29, as shown on the display 502 of interface 500, when the outputs touch screen cell 582 is selected, touch screen cells 588, 589, 590 and 591 of the touch screen 504 are displayed on the display 502 of the interface 500 indicating components that can be selected. Cells that cannot be selected are grayed out. For example, in FIG. 29, touch screen cells 588, 589 and 590 representing a relay, an LED and a Status LED are grayed out. The user may make a selection of the components the user wishes to disarm by pressing the touch screen cells representing the components. For example, a user may disarm Relay 1 by touch screen cell 591. The user may then press the key 538 adjacent to the OK tab 562.

As further shown in FIG 29, the user also has the option to energize or de-energize components using touch screen cells 592 or 593. If a user selects to deenergize components, a display similar to FIG. 28 appears. Referring to FIG. 28, the components that were selected to be deenergized are listed on the display 502. The user may then press the key 542 adjacent to the Execute tab 580 to arm the selected component. If the devices are deenergized, a trouble reports on the system indicating exactly what has been disarmed and the Partial System Disable LED 522 glows steady yellow.

Referring again to step 620 in FIG. 6A, and to FIG. 11, after the user has displayed the menu screen, the user also is provided with the option of selecting the installment mode by pressing key 534 above the installment tab 572. The user interface of the present invention further includes special functions to make it easy for installers to commission a new fire safety system or part of a fire safety system. Such a feature may be selected by the user in step 1150 of FIG. 6D, where the system may receive a user request to place the user interface into an installment mode.

In step 1155, FIG 6D, the system is configured such that outputs are not activated but information about the outputs is displayed on the interface so that the installer can determine whether or not the outputs are functioning. This method allows the installer to test the system without inconveniencing building occupants. For example, instead of having to test a bell alarm, or recalling an elevator or activating a ventilator fan during normal working hours, information about the operability of the bell alarm is displayed on the user interface.

In step 1160, when the system is in the installment mode, all input events in the system are all preferably self-restoring. In an alternative embodiment, the user may pre-determine which input events are self-restoring. Accordingly, the operator does not have to go through reset to clear the troubles in the system. This feature overcomes the problems associated with prior systems where the normal operation of a fire alarm system is to latch the alarms and troubles so that they may be acknowledged before clearing the problem and then resetting the panel to clear the alarm. This procedure is very time consuming, especially in systems that take some time to return to quiescent state after reset. The present invention overcomes this problem by allowing inputs events to be self-restoring.

In step 1165, a method is provided to force either an output to activate or to artificially stimulate the input to the logic function so that the logic function can be tested without actually activating the devices which are spread throughout the building. This feature is provided since it is inconvenient to have a technician go to each of the input devices to step 1150, if the interface receives a user request to enter into the installment mode, the stimulate them during testing of logic function outputs.

In step 1170, FIG. 6E, the user is presented with the option of debugging one or more system device loops. In step 1170, using the More/Info+ key, the user may request the interface to display a list of system nodes. In step 1175, using the up and down buttons, the user may select a node. In step 1180, the user may press the More/Info+ key to request that a list of modules for the selected node be displayed. In step 1185, using the up and down buttons, the user may select a module to debug. At this point, the user may debug device loop controlled by the module. The user is presented at this point with two options. One option is to have the user interface operational for modules not being debugged. The other option is to display information on the user interface only about the module being debugged, and not about the modules currently operational.

In step 1190, if the user selects the operational mode where the interface is operational for modules not being debugged, the system operates as it normally would while a device loop is being debugged. The loop that is under test is in debug mode while the rest of the system is operating normally. Accordingly, the interface remains fully functional for displaying system events about the fire safety system while the loop that is under test is being debugged. This avoids the problem associated in prior systems where the entire system has to be shut down while one a loop is added to the fire safety system.

In step 1195, the user may choose to display information only about the device loop being debugged. This step allows an installer to use the interface to select sections of the system to be debugged. Accordingly, only the messages from the selected section or sections are displayed on the interface display. This avoids the problems associated with too many alarms and troubles from other parts of the system being displayed on the display while one section of the system is being debugged. The normal operation of a fire alarm system is to latch the alarms and troubles so that they may be acknowledged before clearing the problem and then resetting the panel to clear the alarm. This procedure is very time consuming, especially in systems that take some time to return to quiescent state after reset. Accordingly, this mode allows an installer to more efficiently debug a section of the system.

Referring to FIG. 11, a user selecting the installation mode by pressing key 534 above the install tab 572 may be provided with a further detail display, such as that shown in FIG. 9, by pressing key 548. The resulting display 502 can give the user further information about the system and the status of the installation of a node, module or device, as well as the status of the installation of the node, module or device. In a similar way as described with respect to FIGS. 9 and 10, a user can then press a key to obtain a map showing where a node, module or device is being installed in a facility.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence therof are intended to be embraced therein.

What is claimed is:

1. A method for controlling a fire safety system comprising:

providing a user interface having a display for controlling and displaying information about said fire safety system, said fire safety system comprising hierarchical levels of elements, said hierarchical levels of elements comprised of one or more nodes, each said node capable of controlling a plurality of modules, wherein each module is capable of controlling a plurality of devices, and wherein each device is comprised of one or more components;

using said user interface to advance through levels of information about said hierarchical levels of elements on said display to select an element, and receiving a user input to change the operational state of said element and wherein said user interface is capable of displaying a map for displaying where in said fire safety system a system event is occurring, wherein hazmat icons are displayed on said map to indicate the location of hazardous materials within a building said fire safety system is located in.

2. The method according to claim 1, displaying information about a node after a node has been selected using said user interface.

3. The method according to claim 2, further comprising changing the operational state of said selected node using said user interface.

4. The method according to claim 2, further comprising displaying information about a plurality of modules controlled by said node, and using said user interface to select a module.

5. The method according to claim 4, further comprising changing the operational state of said selected module using said user interface.

6. The method according to claim 4, further comprising receiving a user request to generate a report about said selected module, and displaying a report about said module on said user interface.

7. The method according to claim 4, further comprising displaying information about a plurality of devices controlled by said selected module, and receiving a user request to select an individual device.

8. The method according to claim 7, further comprising changing the operational state of said selected device using said user interface.

9. The method according to claim 8, further comprising displaying touch screen cells on said display representing components of a device after a device has been selected, and using said touch screen cells to selectively arm or disarm said components.

10. The method according to claim 1, using said user interface to place an element in an installment mode so that maintenance such that one or more new elements may be added to the system.

11. The method according to claim 10, wherein information about system outputs is displayed without said outputs being activated.

12. The method according to claim 11, wherein said interface instructs one or more devices detecting a system event to reset without receiving a user input.

13. The method according to claim 12, wherein said interface can test device logic functions of one or more devices without activating said devices.

14. The method according to claim 12, wherein said interface can test device logic functions of one or more devices without activating said devices.

15. The method according to claim 11, wherein said interface instructs one or more devices detecting a system event to reset without receiving a user input.

16. The method according to claim 10, further comprising receiving a user request to debug a device loop, wherein said user interface is operational for device loops not being debugged.

17. The method according to claim 10, further comprising receiving a user request to debug a device loop, wherein said user interface only displays information about the device loop being debugged.

18. The method according to claim 10, wherein information about system outputs for said elements is displayed without said outputs being activated.

19. The method according to claim 10, further comprising receiving a user request to debug a device loop, wherein said user interface is operational for device loops not being debugged.

20. The method according to claim 10, further comprising receiving a user request to debug a device loop, wherein said user interface only displays information about the device loop being debugged.

21. The method according to claim 1, further comprising providing said user interface with a plurality of dedicated input devices adjacent said display.

22. The method according to claim 1, further comprising providing said user interface with a dedicated key adjacent said display for receiving at least one user input to allow the user to advance through levels of information about said hierarchical levels of elements.

23. The method according to claim 1, wherein said display is a touch screen display.

24. The method according to claim 23, further comprising providing one or more touch screen cells on said display for changing the operational state of said element.

25. The method according to claim 24, wherein said one or more touch screen cells are only operable after a predetermined number of user inputs to obtain information about said system using one or more dedicated input devices are received by said user interface.

26. The method according to claim 1, further comprising providing a plurality of dedicated input devices adjacent said display screen, wherein a dedicated input device is provided for each type of system event, wherein the fire safety system is capable of detecting when a user input is received using one of said dedicated input devices and is capable of displaying information about the system event corresponding to the dedicated input device selected.

27. The method according to claim 1, further comprising displaying a scroll bar on said display and providing at least one dedicated input device adjacent said display for receiving inputs from a user to scroll through system events displayed on said display.

28. The method according to claim 1, further comprising providing at least one input device, adjacent to said display screen, for scrolling though a list of elements displayed on said display and for selecting an element from a list of elements displayed on said display.

29. The method according to claim 1, further comprising displaying information describing said system event.

30. The method according to claim 1, wherein when said system detects one or more system events said system displays on said display the type of system event, a message about said event, the location of the event in the system and the time of occurrence of said event.

31. The method according to claim 1, receiving a user request to display a list of elements, and displaying said list of elements on said display.

32. The method according to claim 31, further comprising receiving a user input to select an element and displaying information said element in response to said user input.

33. The method according to claim 32, further comprising displaying at least one touch screen cell in response to said user input to select an element, and controlling an element in said system in response to a user input using said at least one touch screen cell.

34. The method according to claim 32, further comprising controlling at least one element in said system in response to a user input using said at least one touch screen cell after a user has reached a desired level of information about said at least one element in said system.

35. The method according to claim 34, further comprising displaying two touch screen cells, one cell representing an arming function and one cell representing a disarming function, and in response to a subsequent user input using said touch screen cells, arming or disarming a selected element.

36. The method according to claim 35, further comprising arming all components associated with said selected element in response to a user input.

37. The method according to claim 36, further comprising displaying a plurality touch screen cells, each touch screen cell representing a component associated with said selected element, in response to a user input, and in response to at least one subsequent user input using said touch screen cells, arming only selected components associated with said selected element.

38. The method according to claim 35, further comprising disarming all components associated with said selected element in response to a user input.

39. The method according to claim 38, further comprising displaying a plurality of touch screen cells, each touch screen cell representing a component associated with said selected element, in response to a user input, and in response to at least one subsequent user input using said touch screen cells, disarming selected components associated with said selected element.

40. The method according to claim 39, further comprising displaying two touch screen cells, one cell representing an energizing function and one cell representing an deenergizing function, an in response to at least one subsequent user input using said touch screen cells, selecting components associated with said selected element to be energized or deenergized.

41. The method according to claim 40, wherein only certain components may be energized or deenergized.

42. The method according to claim 31, further comprising displaying a list of nodes in said system in response to a user input.

43. The method according to claim 42, further comprising receiving a user input to select a node and displaying information about said node in response to said user input.

44. The method according to claim 43, further comprising displaying at least one touch screen cell in response to said user input to select a node and controlling said node in said system in response to a user input using said at least one touch screen cell.

45. The method according to claim 42, further comprising displaying a list of modules in said system in response to a user input.

46. The method according to claim 45, further comprising receiving a user input to select a module and displaying information about said module in response to said user input.

47. The method according to claim 46, further comprising displaying the address of the module and the sensitivity of the module.

48. The method according to claim 46, displaying at least one touch screen cell in response to said selection of said module and, in response to a user input using said at least one touch screen cell, controlling said module in said system.

49. The method according to claim 45, further comprising displaying a list of devices in said system in response to a user input.

50. The method according to claim 49, further comprising receiving a user input to select a device and displaying information about said device in response to said user input.

51. The method according to claim 50, displaying at least one touch screen cell in response to said selection of said device and, in response to a user input using said at least one touch screen cell, controlling said device in said system.

52. The method according to claim 49, further comprising displaying the address of the device and the sensitivity of the device.

53. The method according to claim 1, further comprising displaying NFPA fire service icons indicating availability of fire service equipment in said system.

54. A method for controlling a fire safety system comprising:
providing a user interface having a display for controlling and displaying information about said fire safety system, said fire safety system comprising hierarchical levels of elements, said hierarchical levels of elements comprised of one or more nodes, each said node capable of controlling a plurality of modules, wherein each module is capable of controlling a plurality of devices, and wherein each device is comprised of one or more components;
using said user interface to advance through levels of information about said hierarchical levels of elements on said display to select an element, and receiving a user input to change the operational state of said, wherein said user interface may be placed in an installment mode such that one or more new elements may be added to the system using said interface.

* * * * *